United States Patent
Koh et al.

(10) Patent No.: US 6,300,641 B1
(45) Date of Patent: Oct. 9, 2001

(54) PROCESS FOR MODIFYING SURFACES OF MATERIALS, AND MATERIALS HAVING SURFACES MODIFIED THEREBY

(75) Inventors: Seok Keun Koh; Hyung Jin Jung; Won Kook Choi; Kyong Sop Han; Sik Sang Gam, all of Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/149,442

(22) Filed: Sep. 9, 1998

Related U.S. Application Data

(62) Division of application No. 08/835,645, filed on Apr. 11, 1997, now Pat. No. 5,965,629.

(30) Foreign Application Priority Data

Apr. 19, 1996 (KR) .................................................. 96-11994

(51) Int. Cl.[7] .............................. B05D 3/06; B05D 5/00; C23C 14/02; C23C 14/06
(52) U.S. Cl. .................................. 250/492.21; 250/492.3; 204/157.15; 427/525; 427/527; 427/528; 427/529; 427/533; 427/536; 427/539
(58) Field of Search .......................... 250/492.2, 492.21, 250/492.3; 427/525, 527, 528, 529, 533, 536, 539; 204/157.15

(56) References Cited

U.S. PATENT DOCUMENTS

| | | | |
|---|---|---|---|
| 4,474,827 | * | 10/1984 | Ferralli . |
| 5,137,868 | * | 8/1992 | Yamazaki . |
| 5,418,017 | * | 5/1995 | Ohmi . |
| 5,443,862 | * | 8/1995 | Buffat et al. . |
| 5,508,368 | * | 4/1996 | Knapp et al. .................. 427/534 |
| 5,532,495 | * | 7/1996 | Bloomquist et al. . |
| 5,683,757 | * | 11/1997 | Iskanderova et al. . |
| 5,783,641 | | 7/1998 | Koh et al. . |

* cited by examiner

*Primary Examiner*—Susan W. Berman
(74) *Attorney, Agent, or Firm*—Oblon, Spivak, McClelland, Maier & Neustadt, P.C.

(57) ABSTRACT

A process for modifying the surfaces of a polymer, ceramic, ITO or glass by irradiating energized ion particles onto the surfaces of the polymer, ceramic, ITO or glass, while blowing a reactive gas directly over the surface of the polymer, ceramic, ITO or glass under a vacuum condition, to decrease the wetting angle of the surface. The process can be widely used in the fields of polymers because it provides effects of increasing the spreading of aqueous dyestuffs, increasing adhesive strength with other materials and inhibition of light scattering by decreasing the wetting angle of the material surface.

10 Claims, 25 Drawing Sheets

Polycarbonate (PC)
Without Ar+Ion Irradiation
Surface Roughness: 14 Å

Polycarbonate (PC)
Ar+Ion Only Irradiation
Dose: $5 \times 10^{16}/cm^2$
Surface Roughness: 27 Å

Polycarbonate (PC)
Ar+Ion Irradiation with Oxygen
Dose: $5 \times 10^{16}$ Ar+/cm$^2$, O$_2$ : 4 sec
Surface Roughness: 45 Å

PROCESS FOR MODIFYING SURFACES OF MATERIALS, AND MATERIALS HAVING SURFACES MODIFIED THEREBY

This application is a Divisional of application Ser. No. 08/835,645, filed on Apr. 11, 1997, now U.S. Pat. No. 5,965,629.

BACKGROUND OF THE INVENTION

1. Field of the Invention

The present invention relates to a process for modifying surfaces of materials and to materials having surfaces modified by such process, and more particularly, to a process for irradiating energized ion particles onto a material surface, while blowing a reactive gas directly over the material surface, under a vacuum condition in order to decrease a wetting angle of the surface of a polymer, ceramic, glass or indium-tin-oxide (hereinafter, called ITO) surface and to increase an adhesive strength of the material surface.

2. Description of the Prior Art

The wetting angle is an important factor in identifying the condition of a material surface which has been modified. A decrease in wetting angle implies that a polymer surface attracts water and also implies that the surface exhibits hydrophilicity. Thus, the occurrence of a spreading phenomenon increases when an aqueous dyestuff is applied on such a polymer surface, adhesive strength with other materials increases, and light scattering generated by condensation of water in the air onto the surface is inhibited. As described above, the surface condition of a polymer can be modified by decreasing the wetting angle.

In general, changes in wetting angle have been achieved by (1) surface roughening, (2) surface cleaning, (3) providing a coating with hydrophilic functional groups, and (4) directly synthesizing the surface with hydrophilic functional groups, while increases in adhesive strength are achieved by methods similar to those used for changing the wetting angle, namely (1) forming chemical linkages between the two materials to be adhered, (2) surface cleaning, (3) applying a material which is adhesive to the materials to be adhered, and (4) forming the surface with functional groups for assisting chemical bonds with the materials to be adhered (mainly hydrophilic functional groups).

In particular, examples of processes currently used for decreasing the wetting angle in modifying polymer surfaces include surface synthesizing with hydrophilic functional groups, high voltage corona discharge and direct current plasma discharge.

Among these, high voltage corona discharge is a process in which a polymer sample is placed in a vacuum chamber into which a reactive gas or gases are filled until atmospheric pressure is reached and then the sample is ionized by electrons emitted from electrodes to form a plasma having negative ionic charges and positive ionic charges in an electromagnetic amount equal to that of their electrons (hereinafter, referred to as "cold plasma"), and the reactive gas ions thusly formed are reacted with the sample surface to modify the surface thereof. Although this process is most widely used in modifying polymer surfaces, as disclosed in Japanese Laid-Open Patent Publication No. 60-13823 (Jan. 24, 1985), only a process of treating the surface of vinyl chloride with chlorine gas under atmospheric pressure by the use of high voltage corona discharge is disclosed, in which the wetting angle was decreased from 73° to 32°, and this decrease of wetting angle was not prominent.

Although the process is similar to that of high voltage corona discharge, direct current plasma discharge uses a plasma generated through a glow discharge (referred to as a "thermal plasma"), i.e., an ionized reactive gas or gases, which is formed after charging a reactive gas or gases in a vacuum chamber under 0.01–5 torr (atmospheric pressure is 760 torr). However, this process does not exhibit a sufficient effect in decreasing the wetting angle. For example, Japanese Laid-Open Patent Pub. No. 61-171740 (Aug. 2, 1985) discloses that the wetting angle measured after modifying the surface of polymethyl methacrylate (PMMA) polymer in argon gas under a pressure of 0.1 torr was found to be 40°, and the wetting angle increased to 60° after washing the PMMA polymer surface several times with water. Further, the wetting angle measured after modifying the surface of BX3 polymer under a pressure of 0.1 mbar (atmospheric pressure is 1013 mbar) in an oxygen gas atmosphere was found to be between 48° to 20°, when treated with an applied voltage of 10–100 W for 160 seconds [D. W. Fakes, J. M. Newton, J. F. Wattes and M. J. Edgell, Surface and Interface Analysis, vol.10 416–423(1987)].

The conventional processes, as mentioned above, cannot significantly decrease the wetting angle, whereby the effects of spreading aqueous dyestuffs on polymer surface, increasing the surface adhesive strength with other polar materials, and inhibition of light scattering because of water condensation from the air are insufficient. In addition, if the wetting angle is decreased using conventional techniques, the change in the wetting angle tends to approach toward a certain value according to an increase in time for surface modification, as in the case of Teflon (R) (PTFE), whereby the wetting angle with water is changed from about 95° to about 50° when using hydrogen plasma [D. T. Clark and D. R. Hutton, J.Polym. Sci., Part A, 25, 2643(1987)] or is changed from about 110° to about 700 when using a water steam plasma [D. Yousian and H. J. Griesser, Polymer, 32(6) 1126(1987)].

The present invention allows modification of material surfaces by irradiating energized ion particles onto the surfaces of a polymer, ceramic, ITO or glass, while blowing reactive gas or gases directly over the material surface under a vacuum condition.

SUMMARY OF THE INVENTION

Accordingly, it is an object of the present invention to provide a process from modifying material surfaces by irradiating energized ion particles on the material surfaces, while blowing reactive gas or gases directly on the material surfaces under vacuum condition.

It is another object of the present invention is to provide a polymer which has a surface modified by the above process.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

[FIG. 5A: results of C1 (Carbon 1) analysis of non-irradiated sample/ FIG. 5B: results of C1 analysis of sample 1-5];

[FIG. 6A: sample prior to surface modifying/ FIG. 6B: sample 1-3/ FIG. 6C: sample 1-5];

[FIG. 11A: samples 3-1 to 3-4 / FIG. 11B: samples 3-5 to 3-9/ FIG. 11C: samples 3-10, and 3-12 to 3-16];

[FIG. 12A: prior to surface modifying / FIG. 12B: after surface modifying (circular portion)];

[FIG. 13A: atmospheric exposure of sample 3-1/ FIG. 13B: samples 3-1 and 3-2 stored in water/ FIG. 13C: atmospheric exposure of samples 3-11 and 3-14 / FIG. 13D: sample 3-11 stored in water];

[FIG. 14A: results of C1 analysis of sample 3-1 / FIG. 14B: results of C1s analysis of sample 3-2/ FIG. 14C: results of O1s (oxygen 1) analysis of sample 3-2];

FIGS. 15A-1 and 15A-2 15B-1 and 15B-2 are graphs showing the results of an ESCA surface analysis of samples 3-10 and 3-11 [FIG. 15A: results of C1s analysis of samples 3-10 and 3-11/FIG. 15B: results of O1s (oxygen 1) analysis of sample 3-10 and 3-11];

DETAILED DESCRIPTION OF THE INVENTION

Figure 1:
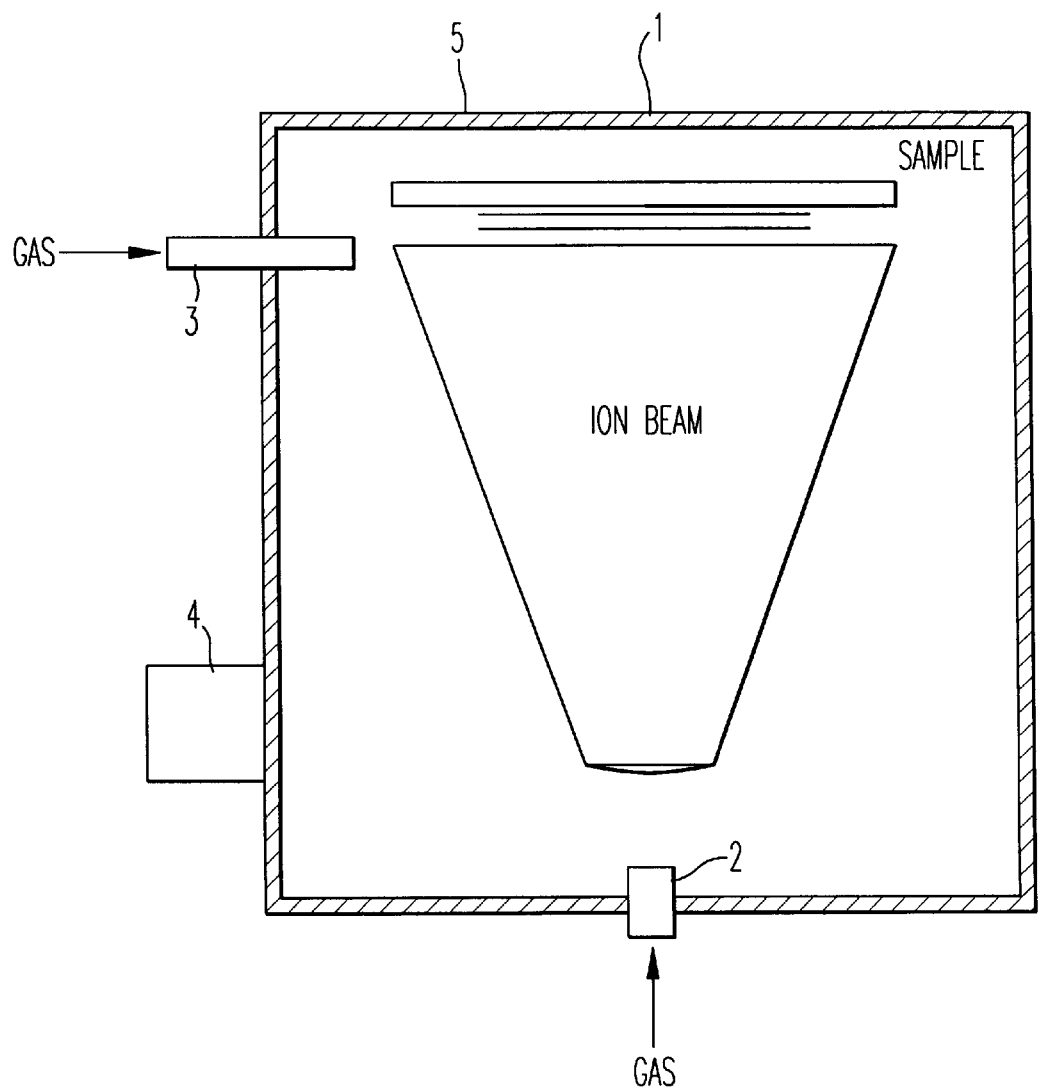
FIG. 1 is a schematic diagram of a surface treating apparatus employed in a method for modifying the surface of a polymer according to the present invention.

The present invention will now be described in more detail with reference to the accompanying drawings.

The term "wetting angle" as used in the present application is defined as the angle formed between a line tangential to a water droplet on a surface and the plane of the surface itself on which the water drop exists. A decrease in the wetting angle means that the water droplet is spread widely and thinly onto the material surface, whereby the attraction property of the surface to water, that is to say, hydrophilicity, increases. The wetting angle is measured by measuring the angle formed between the tangential line and the polymer surface using an ERMA Contact Anglemeter via a microscope after dropping 0.025 ml of three-times distilled water at four different positions on the polymer surface, and determined from a mean value of the measured values at the four positions.

Modification of the polymer surface

First, the present invention relates to a process for modifying a polymer surface by irradiating energized ion particles onto the polymer surface while blowing a reactive gas directly over the polymer surface, to change a wetting angle and increase an adhesive strength of the polymer surface.

When energized ion particles are irradiated onto a polymer surface under certain conditions according to the process of the present invention, the chemical bonds such as carbon-carbon, carbon-hydrogen, and carbon-oxygen, etc. existing in the polymer are broken by the collision of incident energetic ion particles therewith and the bonding sites become activated. Subsequently, these activated sites react with each other or with the irradiated ion particles, or with the reactive gas or gases such oxygen, nitrogen, etc. which are directly blown onto the polymer surface so that the activated groups and reactive gas or gases combine to form hydrophilic groups on the polymer surface.

The formation of hydrophilic groups can be anticipated by measurement after irradiating ions while blowing reactive gas or gases over the polymer surface decreases, and this can be confirmed by ESCA (electron spectroscopy for chemical analysis). In ESCA, the increase in peaks of hydrophilic functional groups for the polymer irradiated in a gas or gases environment compared with that for a non-irradiated one proves that hydrophilic groups are developed on the polymer surface by the irradiation treatment.

In the present invention, a decrease in the wetting angle corresponds to the formation of hydrophilic groups on the polymer surface, and the formation of hydrophilic groups would indicate a decrease in the wetting angle. In other words, when energized ion particles are irradiated onto a polymer surface as mentioned above, the molecular polymer chains on the polymer surface are cleaved and the irradiated energized ion particles continuously proceed to produce the chain cleavage until the particles lose all their energy. In the portions of the chain which have been cleaved, i.e., activated positions, the reactive gas or gases blown around the polymer can react via a reaction path thereof to form hydrophilic groups such as carbonyl, ester, hydroxyl, carboxyl, amino, nitro, etc. Accordingly, according to the process of the present invention, the material surface can be modified to have a hydrophilic or hydrophobic property.

Any polymer comprising bonds of carbon, oxygen, nitrogen, fluorine, silicon, or the like can be used in applying the process for modifying the polymer surface according to the present invention.

As specific examples of such a polymer, polycarbonate (PC), polymethyl methacrylate (PMMA), silicon rubber, polyimide (PI), Teflon (R) (PTFE), polyvinylidene fluoride (PVDF), polyethylene terephthalate (PET), polyethylene (PE), or the like can be used.

According to the process for modifying the polymer surface of the present invention, the irradiation amount of energized ion particles is $10^{14}$–$5 \times 10^{17}$ ions/cm$^2$, and the energy of the ion particles is 0.5 keV–2.5 keV, preferably about 1 kev. In particular, the energy and fluency of ion particles is varied depending on the type of metal. If the irradiation amount of energized ion particles exceeds a certain range, desirable damage to the metal surface, such as sputtering effects, in which portions of the metal surface are separated, undesirable cleavage of polymer chains, and other undesired effects may occur.

The ion beam can be obtained by introducing particles including atoms, molecules and gases to be ionized into an ion gun. As for the ion gun, a Cold Hollowed Cathode, Kaufman type, high frequency type, etc. can be used. Any gas which can be ionized, such as argon, oxygen, helium, xenon, krypton, air (a mixed gas of oxygen and nitrogen), or any mixed gas thereof can be used. By applying voltage to the ion beam, the ion particles obtain energy, as described above. By adjusting the current of the ion beam, the irradiation amount of ion particles can be controlled. The current of the ion beam can be controlled according to the discharge current, discharge voltage, acceleration potential, or the like.

When the ion particles are introduced, the pressure in the vacuum chamber increases from the original vacuum condition of $10^{-5}$–$10^{-6}$ torr to $10^{-3}$ to $5 \times 10^{-4}$ torr, and is maintained thereafter. The above described vacuum condition is appropriately set for generating energized particles. In general, in the case of a low vacuum, if the pressure inside the vacuum chamber becomes too high, arc discharge occurs because of the high voltage (0.5–2.5 keV) applied to the ion beams, and ion particles from the ion beams collide with other residual gas particles to hinder the gas ions from proceeding beyond a certain distance before they reach the material surface to be treated, whereby the generated ions cannot effectively reach the treatment surface. In this case, the distance from the ion gun to the treatment surface must be decreased to ensure that the ion particles reach the metal surface.

According to another embodiment of the present invention, the reactive gas or gases is/are suitable gases which can prepare hydrophilic functional groups, for example, oxygen, hydrogen, nitrogen, carbon monoxide, ammonia, and any mixed gas thereof, etc. The reaction degree or electronegativity of the reactive gas or gases are closely related to the change of the wetting angle.

The introduced amount of these reactive gas or gases is limited in the range of 1–8 ml/min, in order to maintain the proper pressure for plasma generation within the vacuum chamber and to allow a sufficient amount of reactive gas required for the formation of hydrophilic groups. For introducing the reactive gas or gases, it is advantageous that the reactive gas is blown directly onto the material surface simultaneously with the process of irradiating energized particles onto the metal surface.

According to another embodiment of the present invention, when energized ion particles are irradiated onto the metal surface in an ion beam current density of 1–30 $\mu$A/cm$^2$, the irradiation distance is determined depending on the vacuum degree, and the distance is preferably 25 cm or less at a low vacuum of $5 \times 10^{-3}$ torr or less, 25–55 cm at a high vacuum of $5 \times 10^{-3}$ torr–$1 \times 10^{-6}$, and a distance of 55 cm or more at an ultra high vacuum of $10^{-6}$ torr or more can be achieved. When the energized particles reach the material surface to be modified, the required "mean free path" of the ion particles will vary depending on the degree of pressure in the vacuum. Thus, the distance defined above is achieved according to each range of vacuum degree. The irradiation distance can be properly adjusted because the energy of the ion particles is as low as 0.5–2.5 keV, as described above.

The device used in the process for modifying polymer surfaces according to the present invention, as shown in FIG. 1, consists of an ion gun for generating energized ion particles, connected to an electric power source (not illustrated), a sample fixing holder 5 positioned toward the gun, a reactive gas inlet 3 provided with a regulating unit for introducing an appropriate amount of gas in order to generate reactive functional groups on the sample surface, and a vacuum chamber 1 enclosing the above elements. In the vacuum chamber 1, a vacuum gauge 4 is provided to allow constant monitoring of vacuum conditions in the chamber 1.

Figure 19:
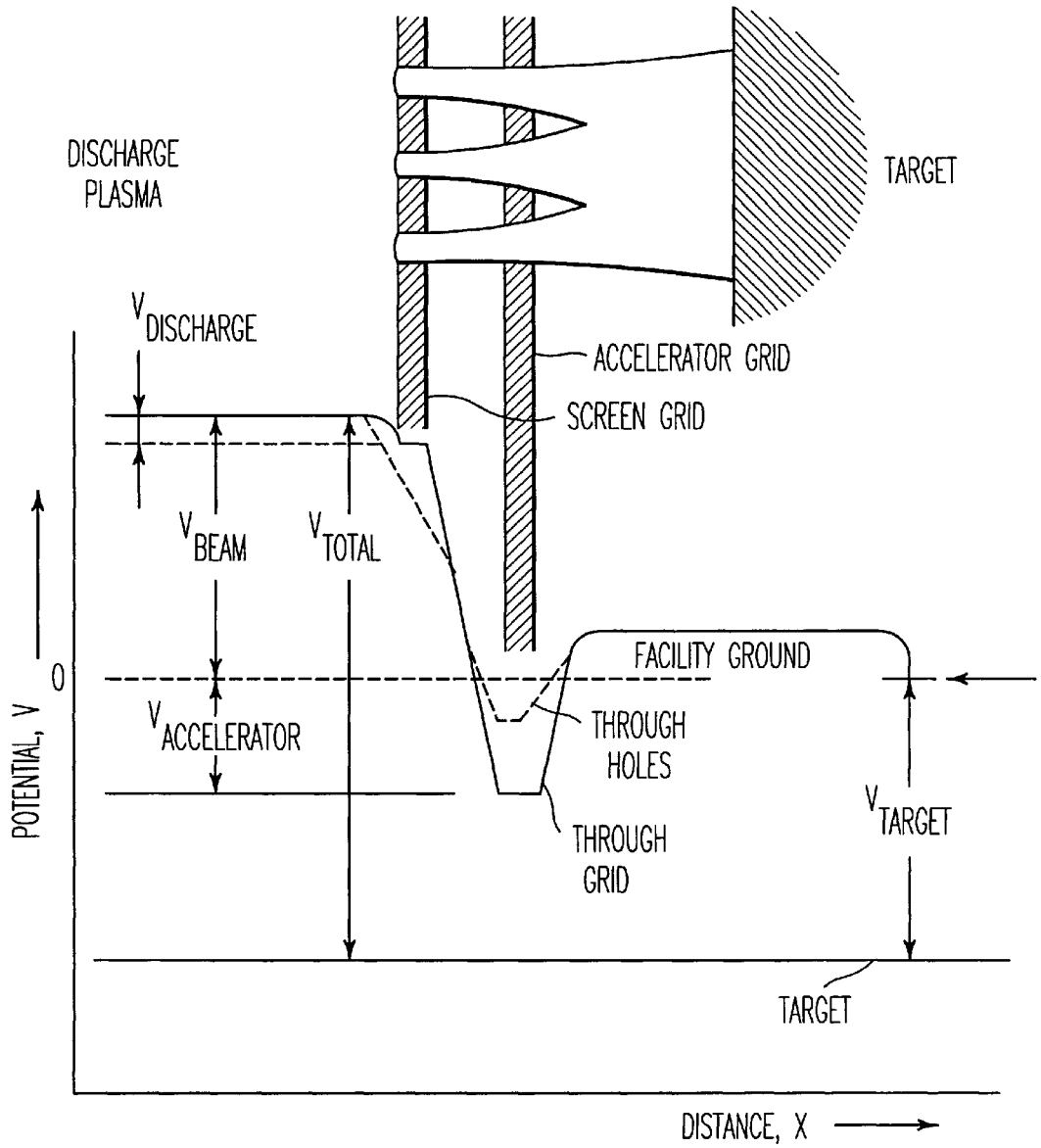
FIG. 19 is a view showing a power source device in the apparatus employed in the process for modifying the material surfaces according to the present invention.

In the apparatus capable of being adopted in the present invention, as shown in FIG. 19, so as to apply higher voltage to the electric power source, a bias voltage is directed to being applied to a target. By applying a negative charge to the sample, ions can be uniformly irradiated onto the surface of materials having a primarily three-dimensional surface configuration topography as well as materials having primarily a two-dimensional topography, resulting in modifying even uneven surfaces.

According to the process for modifying the material surface of the present invention, while maintaining the material the surface of which is to be modified to have a '0' volts ground potential, ion particles taking on a positive voltage charge can be irradiated onto the surface of the material, and a negative voltage is applied to the material the surface of which is to be modified and ion particles taking on a positive voltage charge can be irradiated onto the surface of the material. The process, particularly, can modify the surface of a material having a three dimensional topography evenly.

The process for modifying polymer surfaces using the present device specifically include the following steps:
1. To make the surface of the material clean, the surface of the material is washed with soap and water, an organic solvent (methanol, isopropyl alcohol) or the like which effectively cleans but does not scratch the surface. Alternatively, surface impurities can be removed by irradiating energized particles thereonto.
2. If required, the polymer is stored overnight in a drying oven at a temperature of 100° C. so as to eliminate material absorbed thereon.

3. The cleansed surface of the polymer is then placed in the vacuum chamber 1, in which a vacuum is maintained at a pressure $10^{-4}$–$10^{-6}$ torr monitored by the vacuum gauge 4.
4. A reactive gas is introduced around the polymer by means of gas let 3 while varying the introduced amount of reactive gas within 1–8 ml/min.
5. Energized particles are generated by introducing working gas into the ion gun 2. Here, the electric power source (not illustrated) connected to the ion gun is appropriately adjusted to make the particles have an energy of 0.5–2.5 KeV.
6. The energized particles are irradiated onto the polymer surface in an irradiation amount of $10^{14}$–$5 \times 10^{17}$ ions/cm$^2$ by varying the ion beam current.

The wetting angle of PMMA modified according to the present invention decreases down to 8°, and that of PC decreases down to 12°. In case of PC, the wetting angle of the polymer surface decreased so significantly that water droplets dropped onto the polymer surface flowed continuously and the wetting angle could not be measured.

Thus, according to the process for modifying polymer surfaces of the present invention, hydrophilic groups are formed on the polymer surface to considerably reduce the wetting angle with water, whereby the process can be widely used in various fields of application of polymers because it provides the effects of increasing or spreading of aqueous dyestuffs, increasing adhesive strength with other materials and inhibition of light scattering. In particular, in case that the polymer materials are used in preparing a reflective mirror, a mirror comprised of metal foil and thusly treated transparent polymer materials possesses a very clean surface and has excellent adhesive strength. Further, if other materials are coated by a wet method on generating hydrophilic functional groups, a very smooth and wet coating can be obtained, and this is quite an improvement over the conventional uneven coating obtained by the conventional method. Because the formation of a hydrophilic surface is very important in the field of medical polymers, the process according to the present invention is also useful in the preparation of polymers for medical use.

Further, in the polymer material treated according to the surface modification method of the present invention, changes in surface roughness are not so great that the capacity of information stored per unit area of an optical memory device is not limited by surface roughness and therefore significantly less decrease in memory capacity can be expected when a polymer modified according to the present invention is applied to optical memory device applications.

Surface modification of ceramic, glass or ITO

The present invention also relates to a process for modifying the surface of a ceramic, glass or ITO and to the thusly surface-modified ceramic, glass or ITO, which is capable of improving the strength and surface energy of ceramic, glass or ITO.

The process for modifying the surface of the ceramic or glass using ion beams is different from that for modifying the surface of the polymer using ion beams in the construction and technique. When the surface of a polymer is modified by using an ion beam, an action between the polymers and the energized ion beam causes polymeric chains comprising the polymer to be cleaved by the ion beam and the cleaved chains are combined with one another, which is referred to as a crosslink phenomenon. When an ion beam of hundreds of KeV with a high energy is incident to a polymer, most couplings of chains are cleaved, which is referred to as a carbonization. When the ion beam is irradiated, if a reactive gas is simultaneously introduced such as oxygen or nitrogen onto the surface where unstable chains the couplings of which are cleaved exist, a new polymer is formed due to a chemical reaction between the cleaved unstable chains and the reactive gases.

In comparison with polymers, ceramics and glass exist in a solid form which has a surface strength with a strong coupling. Therefore, the depth and degree of the surface modified by ion beams are smaller than those of the polymers.

On the other hand, when the ion beams are irradiated on the surfaces of the above materials, the stress/strain of the surface is changed or there is formed a surface configuration different from a ceramic-based material, obtained from the reaction with the reactive gas blown on the surface or the change of the stress or a compound layer different from the ceramic-based material due to the change of the stress.

In case of the surface modification of the polymer, the method of the surface modification for enhancing the hydrophilicity of the surface is closely related to the formation of the hydrophilic functional group such as —C=O and —COOH. However, on the surface of a ceramic material there exists dangling bonds which results from a coupling of metal or oxygen not bonded to each other, and due to the existence of the dangling bonds, there is exhibited an electronic configuration of the surface different from the bulk and the stress/strain. Accordingly, when the ion beams are incident on the surface of the ceramic material, such dangling bonds are cleaved or become unstable. When a reactive gas is blown in such a state, new couplings are formed of metal-gas, or gas-gas to generate a phase of chemical compounds on the surface of the ceramic-based material different from the bulk of the ceramic-based material.

For example, if the ceramic material includes oxygen, on the surface, oxygen existing in the ceramic is eliminated and a layer different from the ceramic-based material can be formed on the surface of the ceramic material by the bonding of the gas provided thereon and the elements comprising the ceramic surface. For example, if the ceramic material is composed of $Al_2O_3$, when argon ions are irradiated under an atmosphere of nitrogen, AlN or Al is formed instead of $Al_2O_3$, resulting in the increase of a desired coupling or the change of the surface property.

The methods of increasing the strength of a ceramic material include changing the fabrication process of scattering a two-phase particle having a high hardness, and treating the surface after a ceramic is produced. The present invention employs the latter method. According to the method employed, since the surface of the completed product is modified, the present invention can be adapted to various kinds of ceramic materials without limit.

The magnitude of the ion beams is very small since the conventional surface modification is accelerated at an energy of hundreds of keV, and the accompanying devices are very complicated. As a result, the commercialization is difficult to achieve and even when the surface is modified, the material surface is disadvantageously damaged by the high-energy particles. For example, as the high-energy particles are irradiated onto the surface, the mechanical property of the material is undermined due to a structure change at a high temperature and a chemical resistance to hydrochloric acid or the like is also undermined.

However, according to the present invention, since the surface is modified at a relatively low energy of a few keV or preferably 0.5 to 2.5 keV, there is substantially no limit in the magnitude of the energy of the ion beams, and in addition the apparatus is simplified to a great degree, as a result of which commercialization is feasible and the surface is little damaged and the material strength is increased. Therefore, the conventional disadvantages can be overcome.

ITO thin film has a good transparency in the spectral region of visible rays and a small resistance value. Therefore, it is typically employed as a conductive transparent thin film, which enables a wide application. However, when it is used as a transparent electrode, since the adhesive force to various metals used as an electrode material is not so good, an increase in the adhesive force between the ITO and the metal material is considered as important.

The adhesive force of the ITO surface is identified through the measurement of a contact angle. According to the present invention, ITO is treated by ion beams of a low energy which causes a less damage on the ITO surface, thereby causing no damage on the sample surface and enhancing the bonding force to metals.

A process for modifying the surfaces of ceramic, ITO or glass according to the present invention includes irradiating energized ion particles onto the surface of a ceramic, ITO or glass, while blowing a reactive gas directly on the surface of the ceramic, ITO or glass under a vacuum condition.

In case that the surface modification is adapted to a ceramic material, the material is cleaved to make a sample and polished to have a thickness of 1 $\mu$m to eliminate an effect of the surface roughness on the strength. Then, annealing is performed in air for one hour at a temperature of 1000° C. to eliminate any remaining stress caused by the cleavage and polishing, which is necessary to ensure the accuracy of the experiment. However, in commercializing the product, a thermal treatment and a polishing process are not necessarily required. In the surface modification, the existence of foreign substances on the modified surface prevents an interaction with the ion beams and causes a shadow effect so a that the corresponding shadowed portion is not modified. Therefore, a clean surface is required. Accordingly, the material is required to be kept as clean as possible and if the surface is contaminated, etching can be carried out thereon in advance.

When the process of the present invention is adapted to a ceramic sample, the reactive gas existing around the surface of the sample is expected to react with the surface atoms activated by the collision of energized ions and form AlN or AlON bond.

The ceramic materials capable of being employed in the present invention include $Al_2O_3$, $ZrO_2$, $SiO_2$ but are not limited to those particular compounds. The present invention can be adopted to a planar ceramic material, and also adopted when a finishing polishing is difficult to perform due to a complicated shape including holes. Here, the present invention can be employed after the ceramic material has been processed to take on a proper shape.

Since the surface-modified ceramic material produced according to the process of the present invention obtains an enhanced contact force with metal, it can be used for a stuff requiring a wetness resistance such as a tube for temperature measurement of molten metal or a melting pot crucible for molten metal.

In the process for modifying the surfaces of a ceramic material, glass or ITO, the kinds of energized ion particles, irradiation amount of ion particles, energy of the ions and initial vacuum condition are similar to the above-described, and an appropriate condition can be selected by a simple experiment according to kind of the ceramic material, glass or ITO.

However, when the present invention is applied to a ceramic material, the above-described gas or gases can be used as a reactive gas, but the preferred gas is that which can form a chemical compound different from the basic material on the ceramic material surface. For example, in the case of a ceramic material comprising $Al_2O_3$, a reactive gas excluding oxygen is preferably used.

The apparatus and other conditions used in the process for modifying the surface of a ceramic material, glass or ITO are not different from those adopted in the process for modifying the surface of a polymer.

The process of the present invention can change the surface property of each material while causing less damage to the ceramic material, glass or ITO material.

Hereafter, the process for modifying material surfaces by using the present device is described in more detail referring to specific Examples. However, it is not intended to limit the scope of the present invention to these Examples.

EXAMPLES

Example 1

(1) Surface modification for polymer PC

Commercial polymer PC was cut into 10×10×3 mm$^3$ samples which were washed with soap and water or an organic solvent such as methanol or isopropyl alcohol. The samples were stored overnight in a drying oven with the temperature maintained at 60° to remove unwanted materials absorbed in their surface. The obtained polymer samples were placed into a vacuum chamber maintained at a pressure of $10^{-5}$–$10^{-6}$ torr and then, under the conditions described in Table 1 below, an ion generating gas and a reactive gas were introduced through an ion gun and a gas inlet, respectively, to perform surface modification. Here, the introduced amount of working gas was properly controlled to maintain the vacuum in the vacuum chamber at $1\times10^{-4}$ to $5\times10^{-4}$ torr. For surface-treated samples according to the individual conditions, their wetting angles were measured by ERMA wetting Anglemeter and Table 1 is the results illustrated in FIG. 2 (sample 1-1 and 1-2) and FIG. 3 (samples 1-3 to 1-10).

TABLE 1

| No. | IP | IE | AII | RG | ARG |
|---|---|---|---|---|---|
| 1-1 | $Ar^+$ | 0.5–1.5 | $10^{16}$ | — | — |
| 1-2 | $Ar^+$ | 0.5–1.5 | $10^{16}$ | $O_2$ | 4 |
| 1-3 | $Ar^+$ | 1 | $10^{14}$-5 × $10^{17}$ | — | — |
| 1-4 | $Ar^+$ | 1 | $10^{14}$-5 × $10^{17}$ | $O_2$ | 2 |
| 1-5 | $Ar^+$ | 1 | $10^{14}$-5 × $10^{17}$ | $O_2$ | 4 |
| 1-6 | $Ar^+$ | 1 | $10^{14}$-5 × $10^{17}$ | $O_2$ | 6 |
| 1-7 | $O_2^+$ | 1 | $10^{14}$-5 × $10^{17}$ | — | — |
| 1-8 | $O_2^+$ | 1 | $10^{14}$-5 × $10^{17}$ | $O_2$ | 4 |
| 1-9 | $Ar^+$ | 1 | $10^{14}$-5 × $10^{17}$ | $H_2$ | 4 |
| 1-10 | $Ar^+$ | 1 | $10^{14}$-5 × $10^{17}$ | $N_2$ | 4 |

*IP: Ion particles
IE: Ion energy (KeV)
RG: Reactive gas
AII: Amount of ion irradiation (ions/cm$^2$)
ARG: Amount of reactive gas (ml/min)

Figure 2:
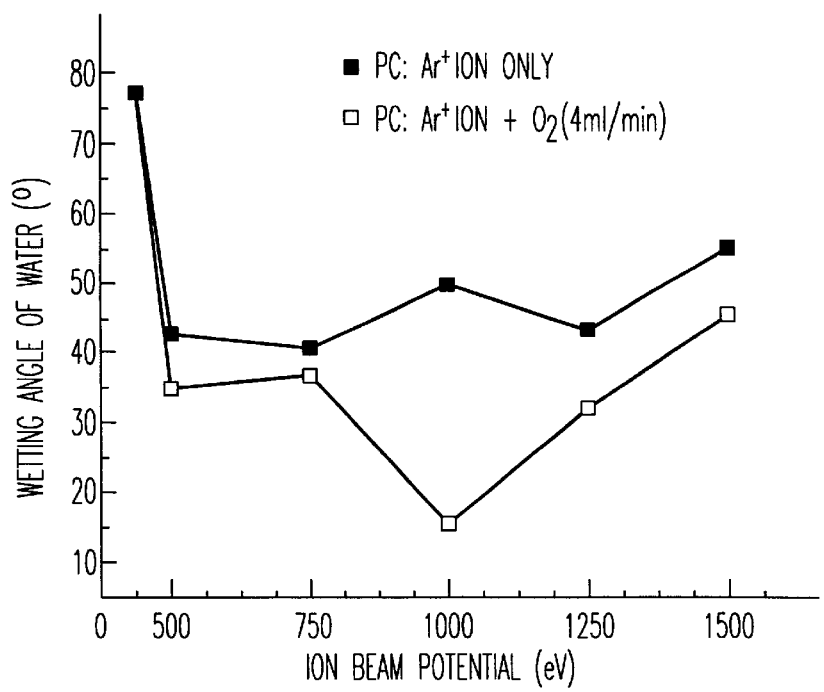
FIG. 2 is a graph showing the results of measuring the wetting angle of samples 1-1 and 1-2 according to Example 1-1.

FIG. 2 is a graph showing the results of the wetting angle change with respect to ion energy charge. When oxygen is blown around the polymer surface, it was shown that there occurs a considerable decrease in wetting angle compared to the typical wetting angle change (mainly 40–50°). Particularly, a minimum wetting angle is achieved at an ion energy of 1 KeV.

Figure 3:
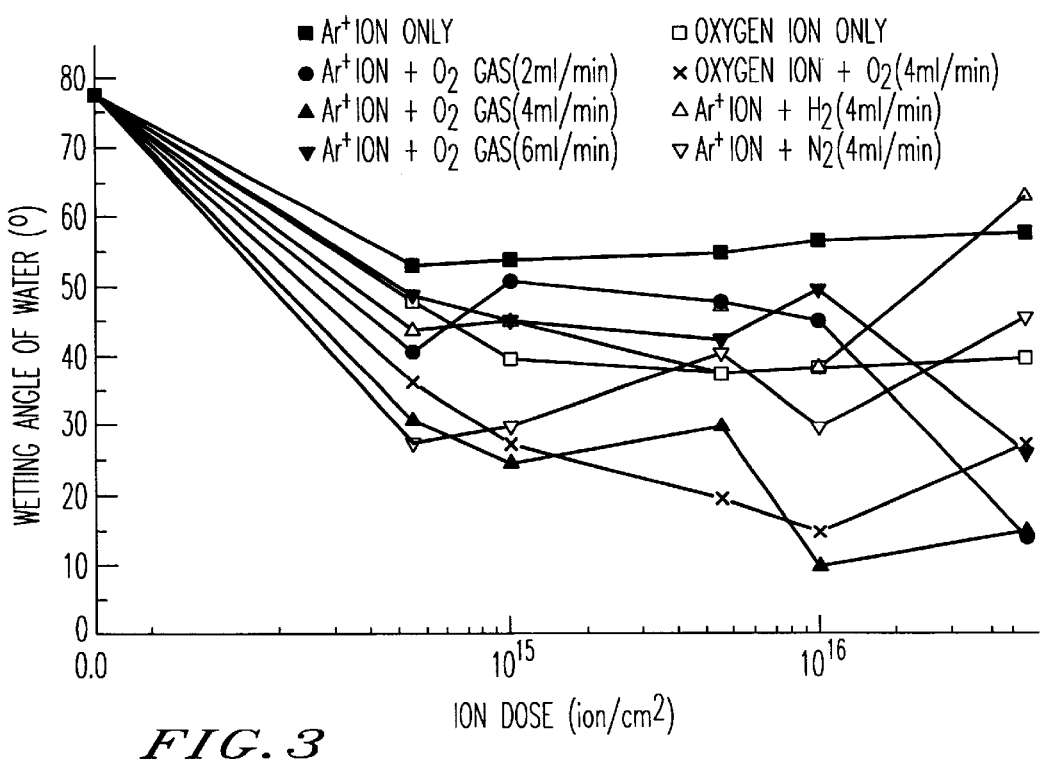
FIG. 3 is a graph showing the results of measuring the wetting angle of samples 1-3 and 1-10 according to Example 1-1.

FIG. 3 is a graph showing the result of the wetting angle change of samples 1-3 and 1-10 depending on the change of the ion irradiation at 1 KeV of ion energy. The wetting angle change of Comparative Example (1-3) in which argon ions were irradiated with no reactive gas blowing, decreased to around 50° at $5\times10^{14}$ Ar+/cm$^2$ and it exhibited a wetting angle with little difference according to the increase of irradiation amount. In contrast, in Examples (1–4) according to the present invention in which argon ions were irradiated while blowing oxygen, there was totally exhibited sufficient decreasing in wetting angle according to the increasing of irradiation amount of argon ions as well as considerable decreasing in wetting angle. Particularly, minimum wetting angle (12°) appeared at an irradiation amount of $10^{16}$ Ar+/cm$^2$.

(2) Wetting angle identifying test

Sample 1-5 (ion irradiation amount–$10^{16}$ Ar+/cm$^2$) that was surface-treated in the above test (1) and had the highest wetting angle decrease was exposed to air and the wetting angle was measured during the course of time. Also the same sample was dipped into 1% dilute hydrochloric acid for a constant time and dried with dry nitrogen gas and then wetting angle was measured again. The results of the wetting angle measurements are illustrated in FIG. 4.

Figure 4:
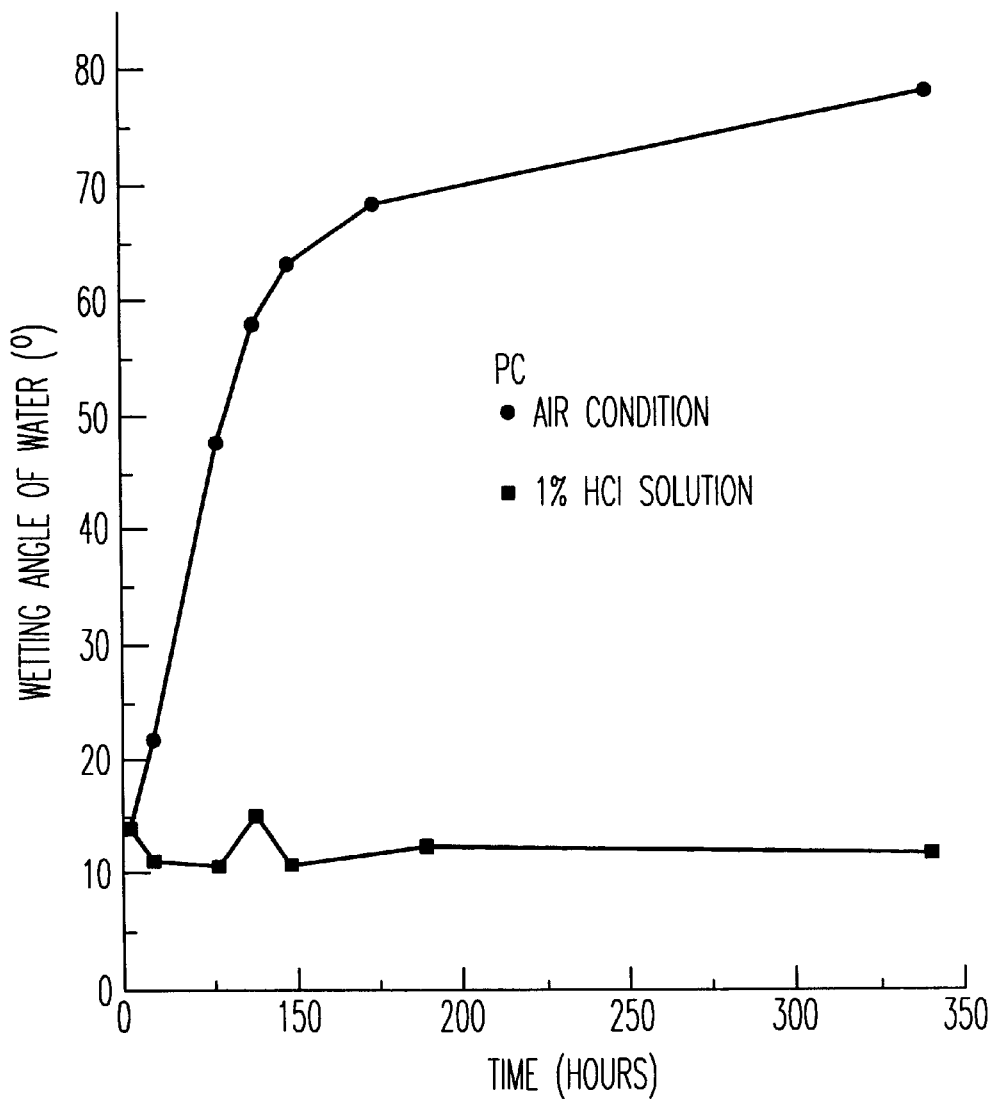
FIG. 4 is a graph showing the results of a test identifying the decrease in the wetting angle with respect to sample 1-5 (ion irradiation=$10^{16}$ ions/cm$^2$) according to Example 1-2.

As shown in FIG. 4, in the sample exposed in the air, wetting angle increased with time, but the sample dipped into 1% diluted hydrochloric acid maintained a minimum wetting angle without significant change. These results confirm that hydrophilic functional groups had formed on the surface of the polymer. Thus, for the sample exposed to air, it can be considered that hydrophilic functional groups formed on the polymer surface rotate with time, towards the direction of the polymer base having many polar functional groups. However, such rotation of the formed hydrophilic functional groups is prevented in the sample dipped into 1% diluted HCl due to the high polarity within HCl solution.

(3) Inspection test for hydrophilic functional group formation

ESCA surface analysis was performed on sample No. 1-5 (ion irradiation amount–$10^{16}$ Ar+/cm$^2$) which is compared with a sample without irradiating ions. The results are illustrated in FIGS. 5A and 5B.

Figure 5A:
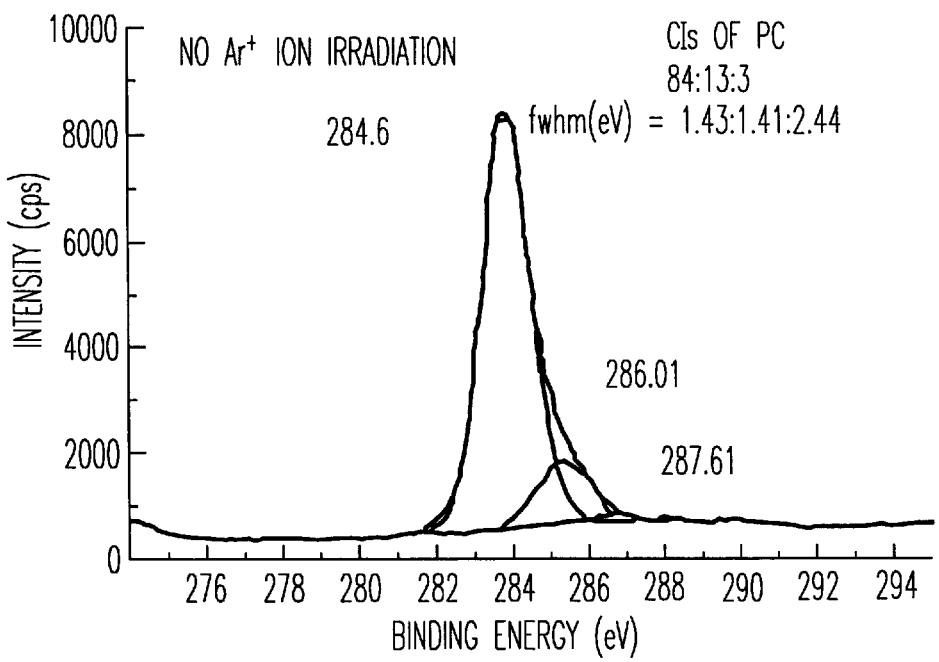
FIGS. 5A and 5B are graphs showing the results of an ESCA surface analysis of sample 1-5 (ion irradiation=$10^{16}$ ions/cm$^2$) compared to a sample which was not irradiated
Figure 5B:
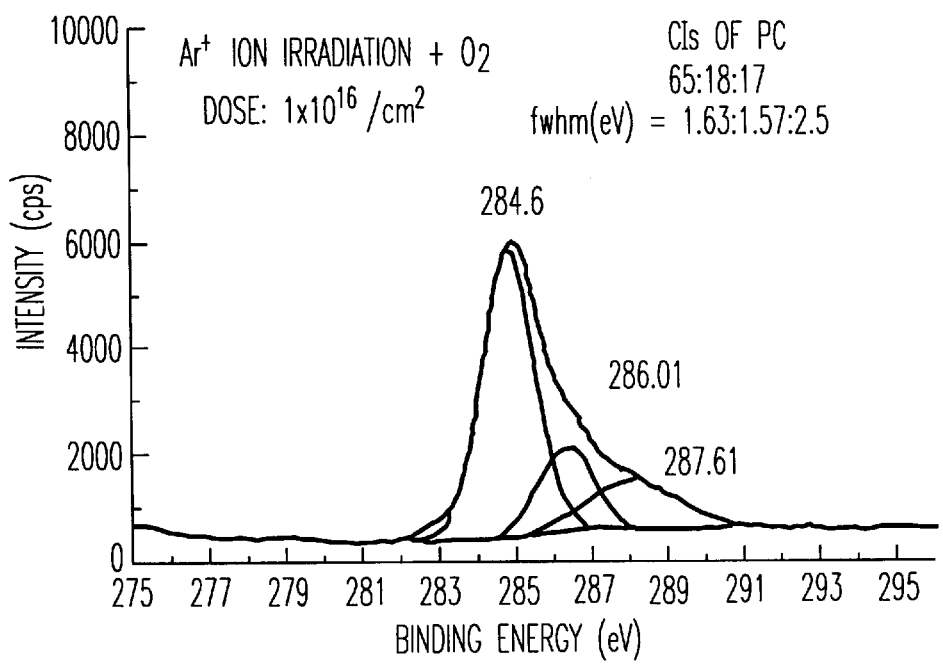

From the result of ESCA analysis with respect to carbon of FIGS. 5A and 5B, it is shown that hydrophilic functional groups were relatively formed more at 286 eV and 287.7 eV. Also, from the result of ESCA analysis with respect to oxygen, it was shown that when the polymer surface was modified according to the present invention, oxygen reacted with the surface molecules to be bound therein so that the amount of oxygen which acts to render the surface hydrophilic increased about two-fold or more.

(4) Surface roughness test

For the sample without ion irradiation and surface-treated sample 1-3 (ion irradiation amount=$5\times10^{16}$ ions/cm$^2$) and 1-5 (ion irradiation amount=$5\times10^{16}$ ions/cm$^2$), their surfaces were observed by atomic force microscope (AFM) and the results are illustrated in FIG. 6.

Figure 6A:
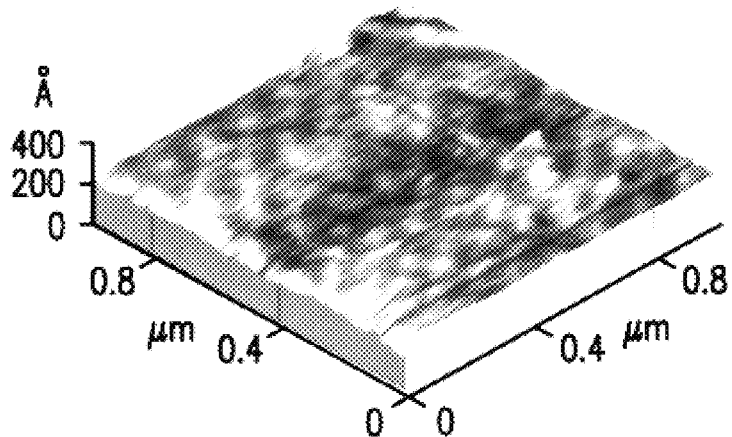
FIGS. 6A through 6C are microphotographs by AFM of samples 1-3 (ion irradiation=$5 \times 10^{16}$ ions/cm$^2$) and 1-5 (ion irradiation=$5 \times 10^{16}$ ions/cm$^2$) compared to a sample prior to surface modifying according to Example 1-4
Figure 6B:
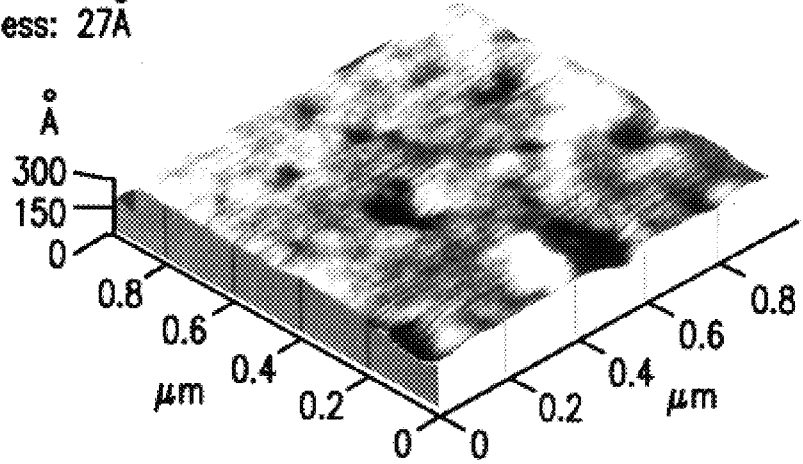
Figure 6C:
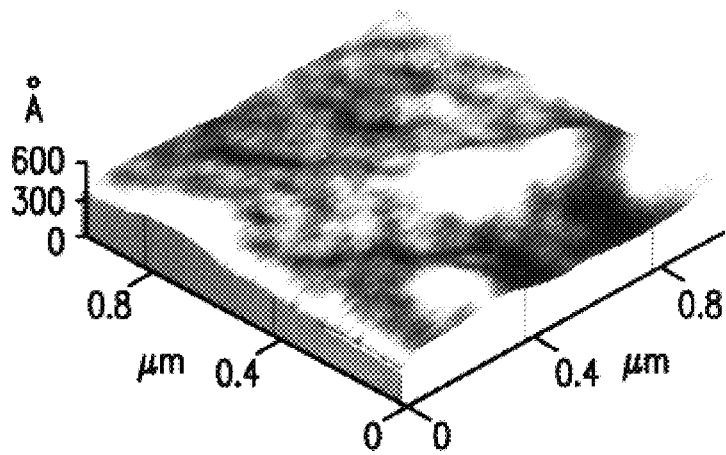

In FIG. 6, when only argon was irradiated onto the sample which had an original surface roughness of about 14Å (refer to FIG. 6A) prior to surface modification, the surface roughness was increased to about 22–27 Å (refer to FIG. 6B), and when surface modification was performed under an oxygen atmosphere, surface roughness was found to be in the range of 26–30 Å (refer to FIG. 6C) similar to the above result. Such change in surface roughness shows considerable differences compared to the conventional surface modification method wherein surface roughness only changed mainly in units of μm.

(5) Peel-off test with Scotch (R) tape

Figure 7:
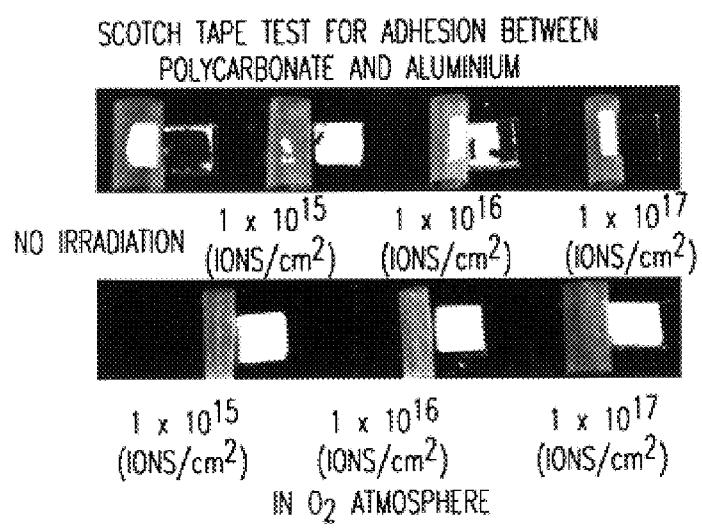
FIG. 7 is a photograph showing the results of a peel-off test with Scotch (R) tape of sample 1-5.

Aluminum was evaporated (1000 Å) onto a sample without ion irradiation and surface-modified samples 1-3 and 1-5 with ion irradiation of $10^{15}$, $10^{16}$ and $10^{17}$, respectively, by thermal evaporation and then, a peel-off test with Scotch (R) tape was performed for the above samples, and the results are illustrated in FIG. 7.

In FIG. 7, it shows that when only argon ions were irradiated, the aluminum was partially or totally peeled-off with Scotch (R) tape. However, when the aluminum was deposited after surface modification under an oxygen atmosphere according to the present invention, the deposited aluminum ddi not peel off.

Example 2. Surface modification for polymer PMMA (1) Surface treatment

Figure 8:
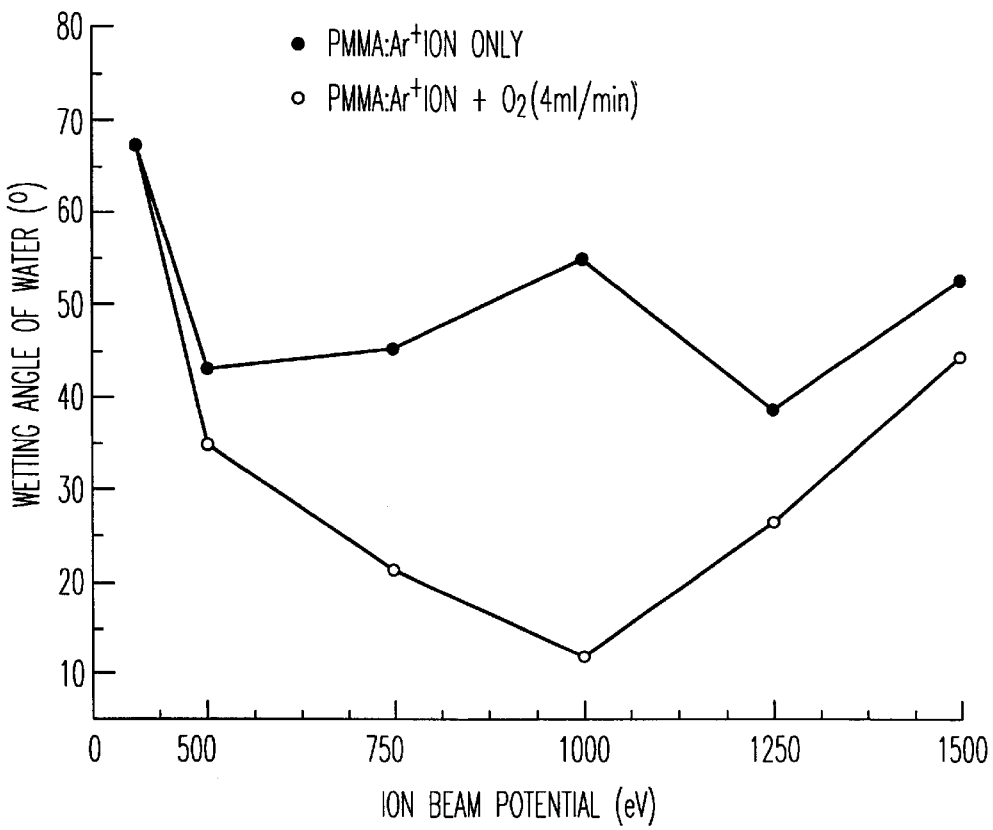
FIG. 8 is a graph showing the results of measuring the wetting angle of samples 2-1 and 2-2 according to Example 2-1.

Commercial PMMA was surface-treated in accordance with the same procedure as in Example (1-1) under the conditions described in Table 2 below, and then the wetting angle was measured, and the results are illustrated in FIG. 8 (sample 2-1 and 2-2) and FIG. 9 (sample 2-3 to 2-6).

TABLE 2

| No. | IP | IE | AII | RG | ARG |
|---|---|---|---|---|---|
| 2-1 | Ar+ | 0.5–1.5 | $10^{16}$ | — | — |
| 2-2 | Ar+ | 0.5–1.5 | $10^{16}$ | $O_2$ | 4 |
| 2-3 | Ar+ | 1 | $10^{14}$-$5\times10^{17}$ | — | — |
| 2-4 | Ar+ | 1 | $10^{14}$-$5\times10^{17}$ | $O_2$ | 4 |
| 2-5 | $O_2^+$ | 1 | $10^{14}$-$5\times10^{17}$ | — | — |
| 2-6 | $O_2^+$ | 1 | $10^{14}$-$5\times10^{17}$ | $O_2$ | 4 |

*IP: Ion particles
IE: Ion energy (KeV)
RG: Reactive gas
AII: Amount of ion irradiation (ions/cm$^2$)
ARG: Amount of reactive gas (ml/min)

FIG. 8 is a graph illustrating the results of wetting angle change with respect to ion energy change. When oxygen was blown around the polymer surface, there was a remarkable change of the wetting angle and considerable wetting angle decreases can be observed compared to typical wetting angle decreases. Particularly, a minimum wetting angle was obtained at 1 KeV ion energy.

Figure 9:
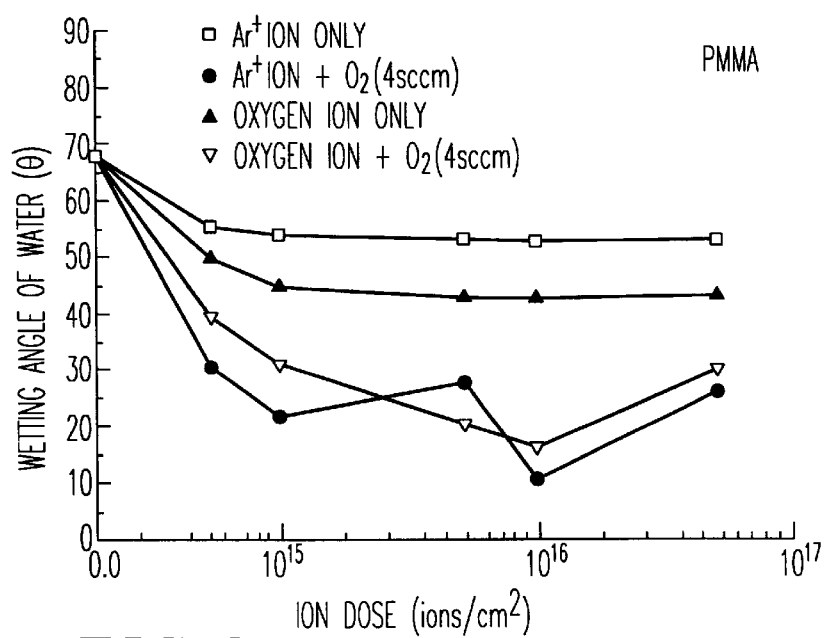
FIG. 9 is a graph showing the results of measuring the wetting angle of samples 2-3 to 2-6 according to Example 2-1.

FIG. 9 is a graph illustrating the results of wetting angle change of samples 2-3 to 2-6 according to ion irradiation change at 1 KeV ion energy. The considerable wetting angle decreases were observed when energized ion particles were irradiated while blowing oxygen around the sample and according to the increase in irradiation amount of argon ions, a significant decrease in wetting angle was observed. In particular, a minimum wetting angle of 8° was observed at irradiation of $10^{16}$ Ar+ ions/cm$^2$.

(2) Wetting angle identifying test

Sample 2-4 (ion irradiation amount–$10^{16}$ ions/cm$^2$) the surface of which was treated as in the above test (1), had the greatest wetting angle decrease when the sample was exposed in the air, and the wetting angle was measured over the course of time. Also the same sample was dipped into 1% dilute hydrochloric acid for a constant time, dried with dry nitrogen gas and then the wetting angle was measured. The results of the wetting angle measurements are illustrated in FIG. 10.

Figure 10:
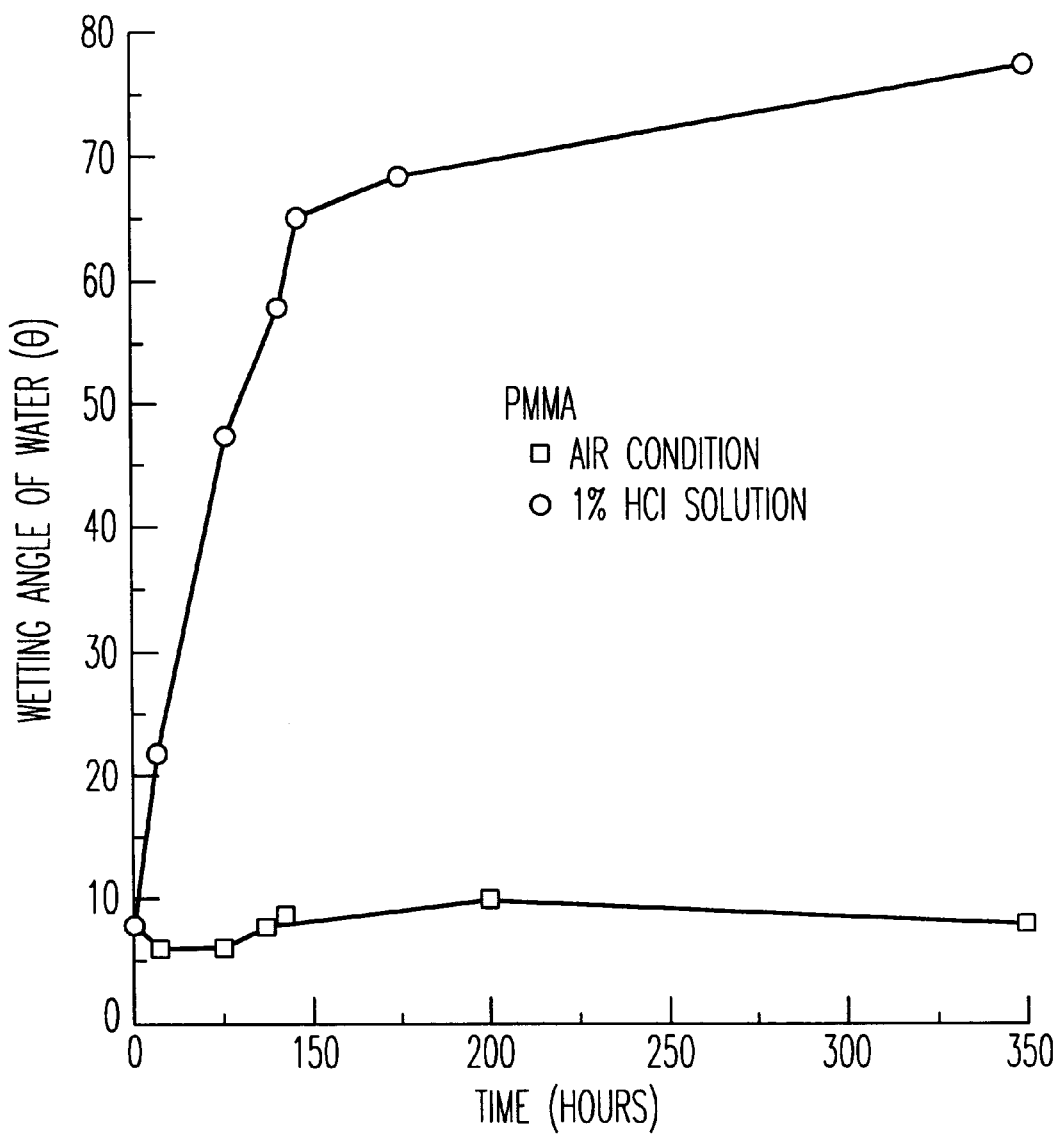
FIG. 10 is a graph showing the results of measuring the wetting angle of sample 2-4 (ion irradiation=$10^{16}$ ions/cm$^2$) according to the Example 2-2.

As shown in FIG. 10, in the sample exposed in the air, wetting angle increased with time, but the sample dipped into 1% diluted hydrochloric acid maintained a minimum wetting angle without significant changes.

Example 3: Surface modifying treatment of other polymers (1) Surface treatment

Commercial polymer PTFE, silicon rubber, PI and PET were surface-treated as in Example (1-1) under the conditions listed in Table 3 below. The results are shown in FIG. 11.

TABLE 3

| No. | KP | IP | IE | AII | RG | ARG |
|---|---|---|---|---|---|---|
| 3-1 | Teflon | $Ar^+$ | 1 | $10^{14}$–$10^{17}$ | — | — |
| 3-2 | Teflon | $Ar^+$ | 1 | $10^{14}$–$10^{17}$ | $O_2$ | 4 |
| 3-3 | SR | $Ar^+$ | 1 | $10^{14}$–$10^{17}$ | — | — |
| 3-4 | SR | $Ar^+$ | 1 | $10^{14}$–$10^{17}$ | $O_2$ | 6 |
| 3-5 | PI | $Ar^+$ | 1 | $10^{14}$–$10^{17}$ | — | — |
| 3-6 | PI | $O_2^+$ | 1 | $10^{14}$–$10^{17}$ | — | — |
| 3-7 | PI | $Ar^+$ | 1 | $10^{14}$–$10^{17}$ | $O_2$ | 4 |
| 3-8 | PI | $O_2^+$ | 1 | $10^{14}$–$10^{17}$ | $O_2$ | 4 |
| 3-9 | PI | $Air^+$ | 1 | $10^{14}$–$10^{17}$ | — | — |
| 3-10 | PET | $Ar^+$ | 1 | $10^{14}$–$10^{17}$ | — | — |
| 3-11 | PET | $Ar^+$ | 1 | $10^{14}$–$10^{17}$ | $O_2$ | 6 |
| 3-12 | PET | $Kr^+$ | 1 | $10^{14}$–$10^{17}$ | — | — |
| 3-13 | PET | $Kr^+$ | 1 | $10^{14}$–$10^{17}$ | $O_2$ | 6 |
| 3-14 | PET | $O_2^+$ | 1 | $10^{14}$–$10^{17}$ | — | — |
| 3-15 | PET | $Ar^+$ | 1 | $10^{14}$–$10^{17}$ | $O_2$ | 2 |
| 3-16 | PET | $Ar^+$ | 1 | $10^{14}$–$10^{17}$ | $O_2$ | 4 |

Figure 11A:
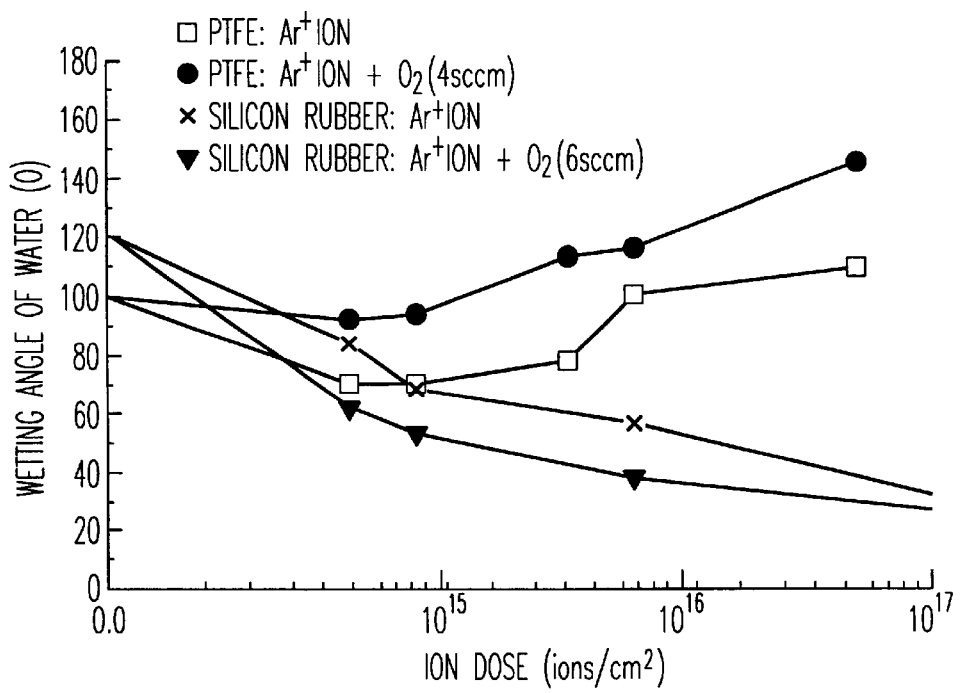
FIGS. 11A through 11C are graphs showing the result of measuring the wetting angle of samples 3-1 to 3-10 and 3-12 to 3-16
Figure 11B:
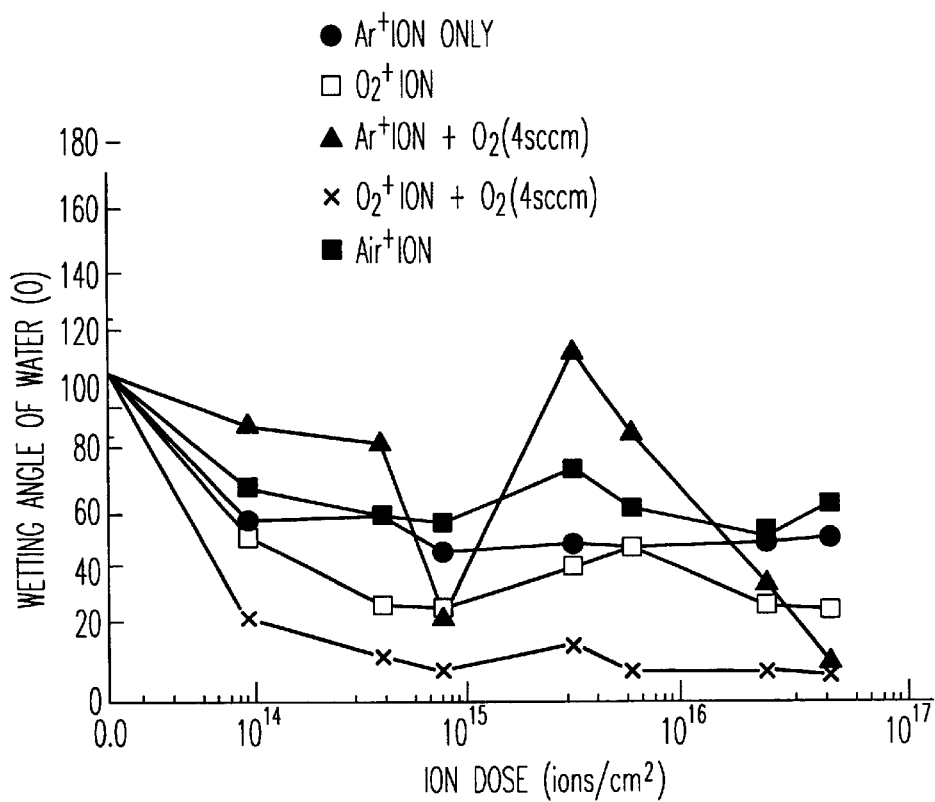
Figure 11C:
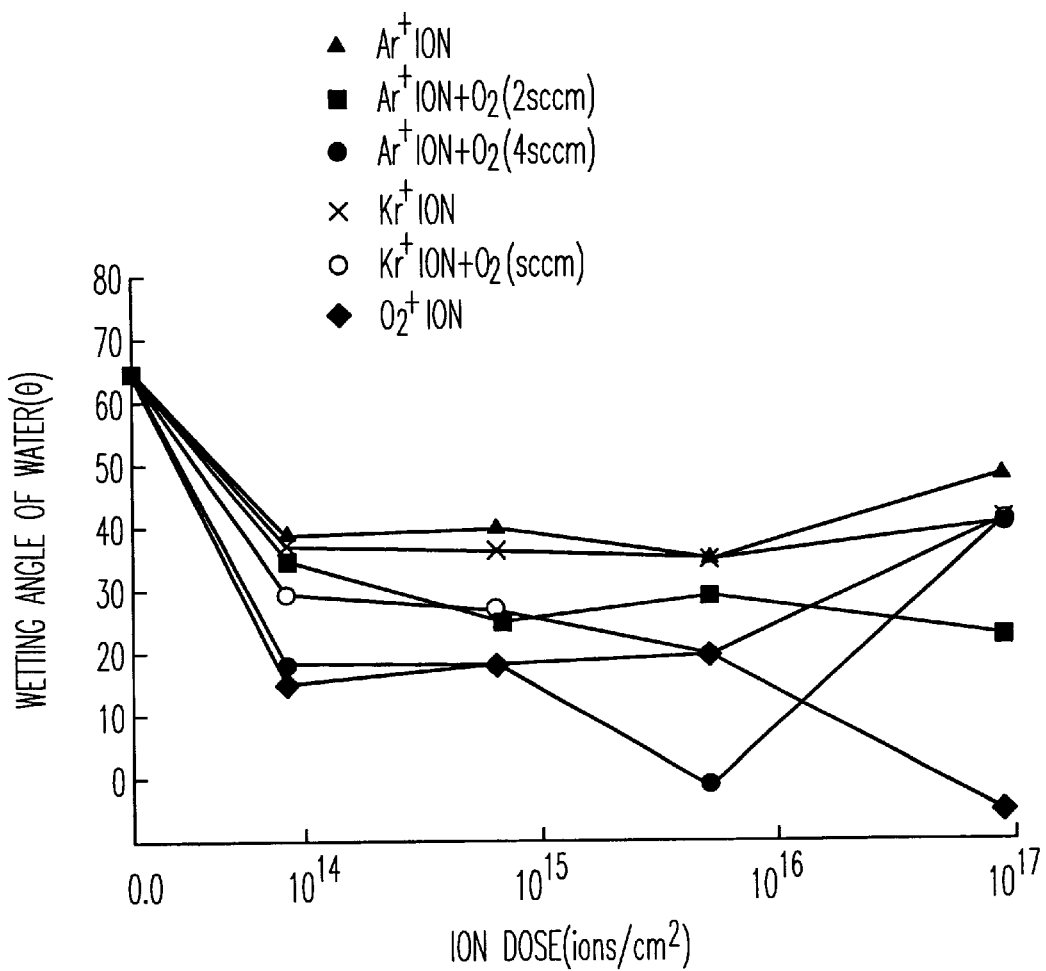

*KP: Kinds of polymers
IP: Ion particles
IE: Ion energy (KeV)
RG: Reactive gas
AII: Amount of ion irradiation (ions/cm$^2$)
ARG: Amount of reactive gas (ml/min)
SR: Silicon rubber As shown in FIGS. 11A through 11C, the results obtained in case of irradiation while blowing reactive gas, oxygen, etc. around the samples as described above were also similar to the results in the previous experiment, and it was demonstrated that surface modifying treatment using any energized ion particles ($Air^+$, $Kr^+$, $O_2^+$ etc.), not limited to argon ions, can be applied to all polymers.

Figure 12A:
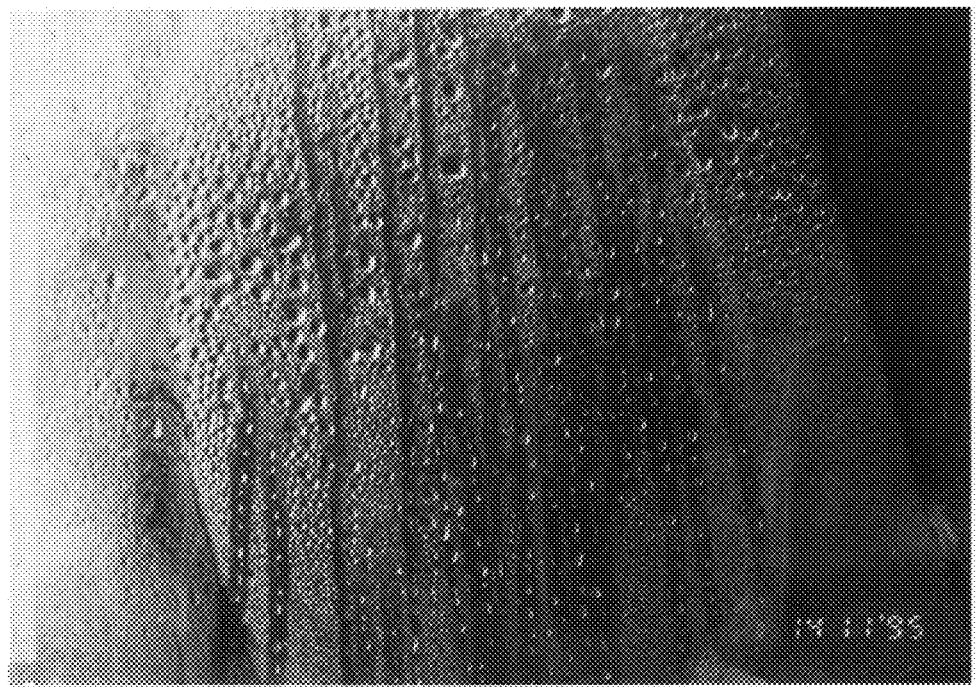
FIGS. 12A and 12B are photographs showing surface conditions after spraying water on polyethylene the surface of which was treated and on polyethylene the surface of which was not treated
Figure 12B:

For example, in the case of PE, when water was sprayed thereon, the water droplets completely spread onto the polymer surface modified according to the present invention (shown in FIG. 12B, the circular portion (lower part of photograph)) to form a transparent mirror-like surface, while on the non-modified surface, water drops formed thereon and thus light scattering occurred (FIG. 12A).

This proves the excellent effects of surface modification in the case of PE.

(2) Test for verifying wetting angle

In the above procedure (1) samples 3-1 (ion irradiation= $10^{14}$, $10^{16}$, $10^{17}$), 3-2 (ion irradiation=$10^{14}$, $10^{16}$, $10^{17}$), 3-11 (ion irradiation=$10^{14}$, $10^{16}$, $10^{17}$), 3-14 (ion irradiation= $10^{17}$) were exposed to air and the wetting angles thereof were measured depending on time, and after storing samples 3-1 (ion irradiation=$10^{14}$, $10^{16}$, $10^{17}$), 3-2 (ion irradiation= $10^{14}$, $10^{16}$, $10^{17}$), 3-11 (ion irradiation=$10^{14}$, $10^{16}$, $10^{17}$) for a certain time, the wetting angles were measured. The results are shown in FIGS. 13A, B, C and D.

Figure 13A:
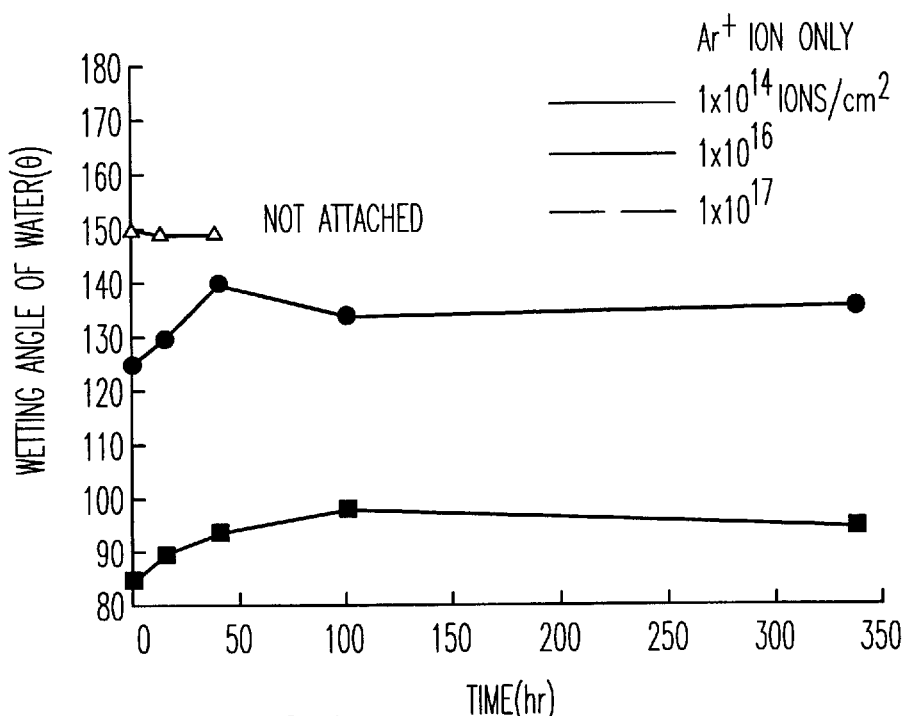
FIGS. 13A through 13D are graphs showing the results of measuring the wetting angle of samples 3-1, 3-2, 3-11 and 3-14 according to example 3-2
Figure 13B:
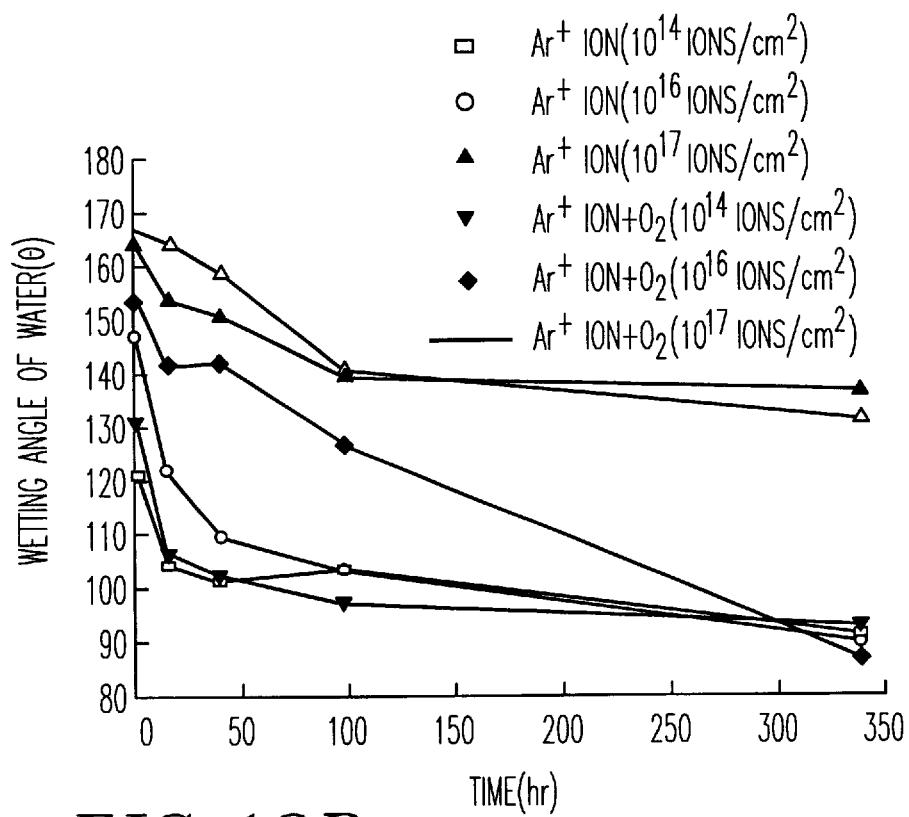

As shown in FIG. 13A, the wetting angle of the PTFE sample (3-1), which was surface-modified by only argon ions, increased somewhat over the course of time when exposed in air, but changes were minor. However, when these samples were stored in water and dried, the detected wetting angles decreased with the lapse of time (FIG. 13B). In contrast, the wetting angle of sample (3-2) which had been surface modified while blowing oxygen, prominently decreased when the sample was stored in water, as shown in FIG. 13B.

Figure 13C:
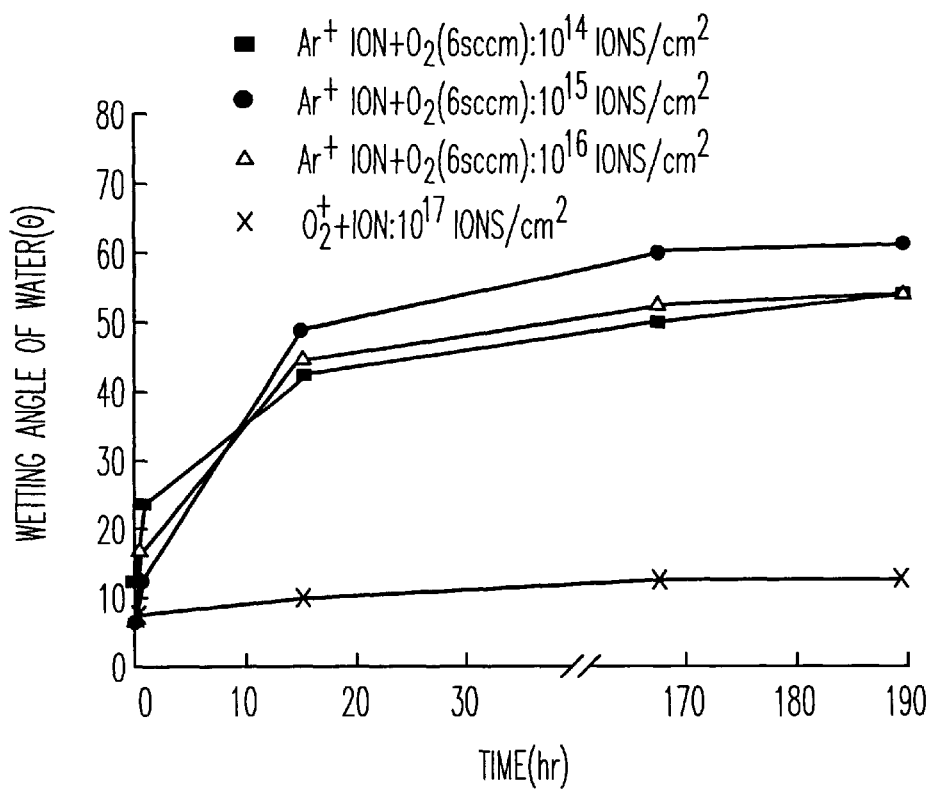
Figure 13D:
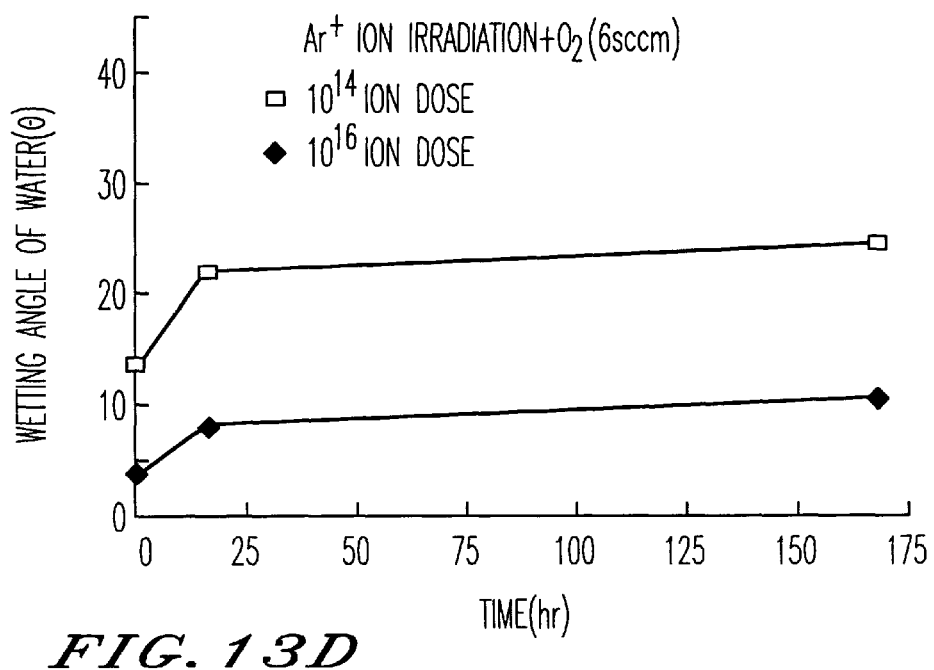

Further, in case of PET, in FIG. 13C, the wetting angle of sample (3-11) which had been surface-modified while blowing oxygen continuously increased with the lapse of time, whereby the surface thereof changed to become hydrophobic, and when these samples were stored in water, the wetting angles did not change and maintained constant values (FIG. 13D). However, the wetting angle of sample (3-14), irradiated by only an oxygen ion beam, was almost maintained without any change with the lapse of time when the sample was exposed to air.

(3) Inspection test for formation of hydrophilic groups

Samples 3-1 and 3-2 which had been surface-modified with ion irradiation of $10^{15}$, $10^{16}$ and $10^{17}$ ions/cm$^2$ were surface analyzed by ESCA, and the results are shown in FIG. 14. In addition, samples 3-10 and 3-11 surface-modified with ion irradiation of $10^{14}$, $10^{16}$ and $10^{17}$ ions/cm$^2$ as well as a sample without ion irradiation were surface analyzed by ESCA, and the results are shown in FIG. 15.

Figure 14A:
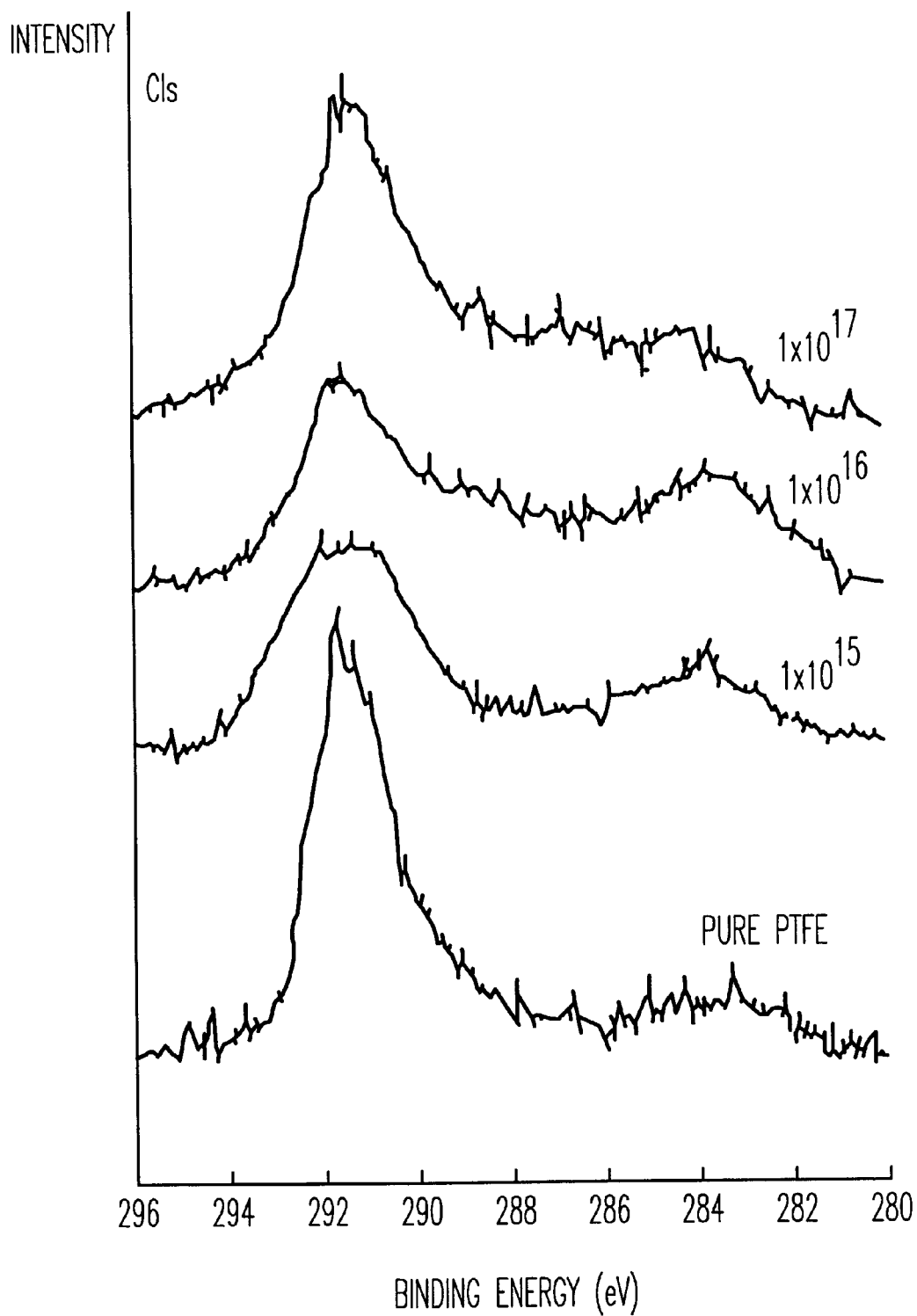
FIGS. 14A through 14C are graphs showing the results of an ESCA surface analysis of samples 3-1 and 3-2
Figure 14B:
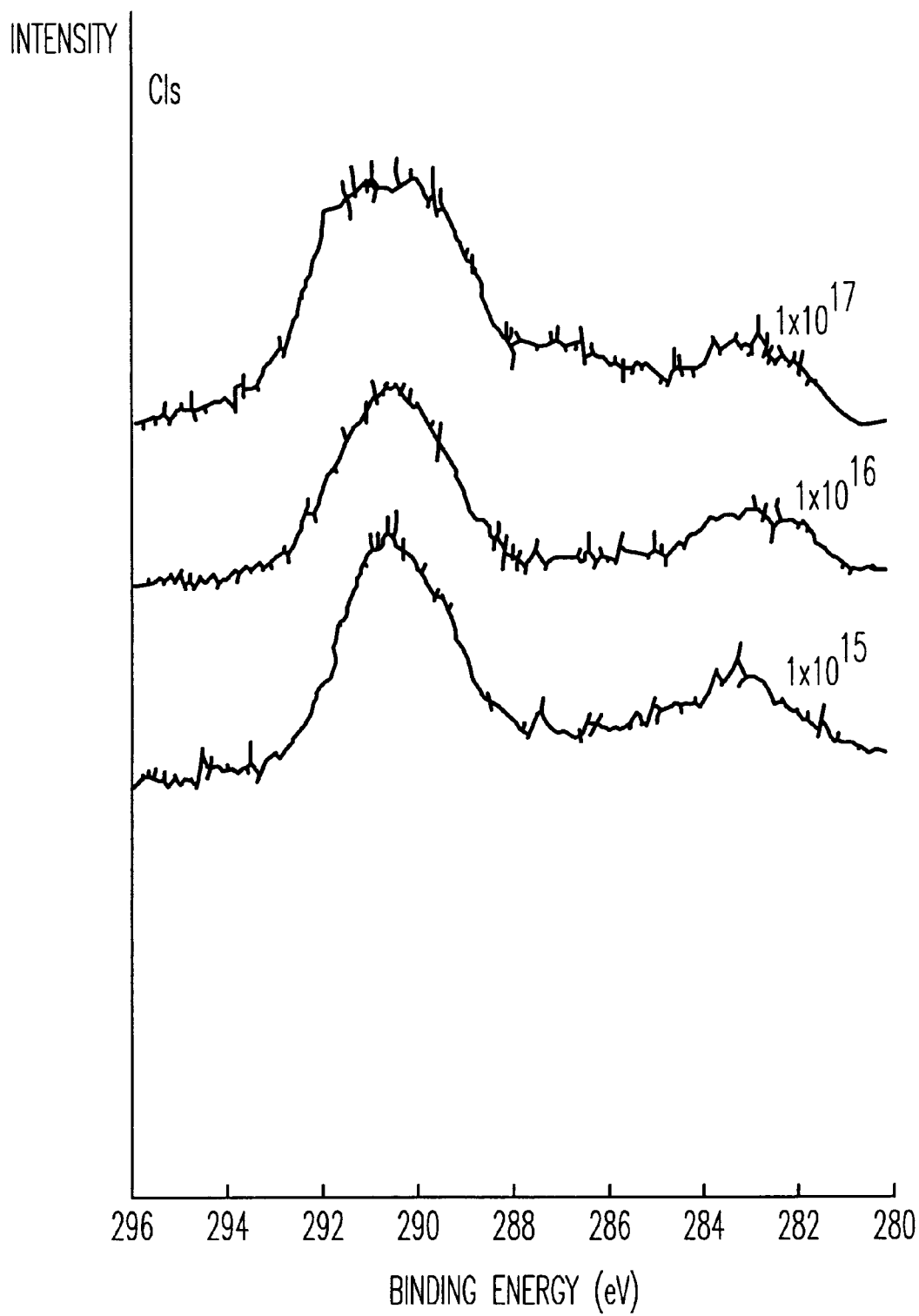
Figure 14C:
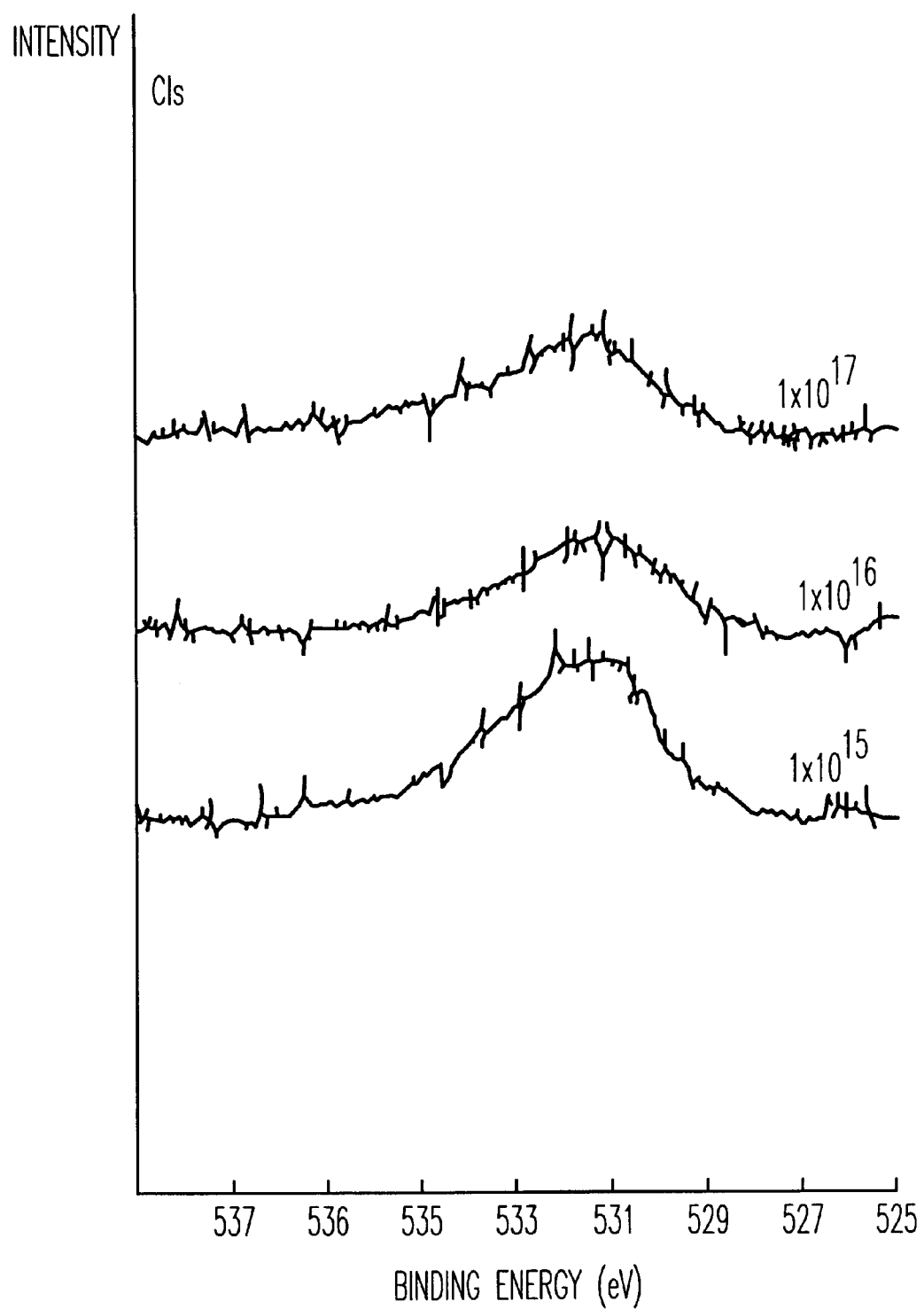

FIGS. 14A and 14B show comparative analytic results using ESCA with regard to Teflon (R). A carbon peak of 292 eV is a peak for C-F bonding and when irradiating argon ions while blowing $O_2$ around the sample, various novel bonds such as C—O, C=O, COO, or the like are formed between C—C bonds (284 eV). In the case of oxygen bond peaks, novel oxygen bonds which had not existed in the original Teflon (R), were generated (FIG. 14C).

In FIGS. 15A-1 and 15-2, when only argon was irradiated onto the surface, the peaks at binding energies of 288 eV and 286 eV, i.e., C=O, C—O bonds, decreased, while when argon was irradiated while blowing oxygen around the polymer, peaks became broader at the positions of 288 eV and 286 eV where hydrophilic functional groups exist on the surface.

Figures 1, 15A:
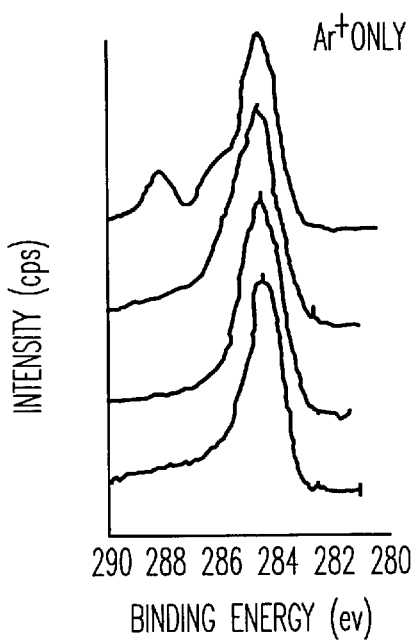
Figures 2, 15A:
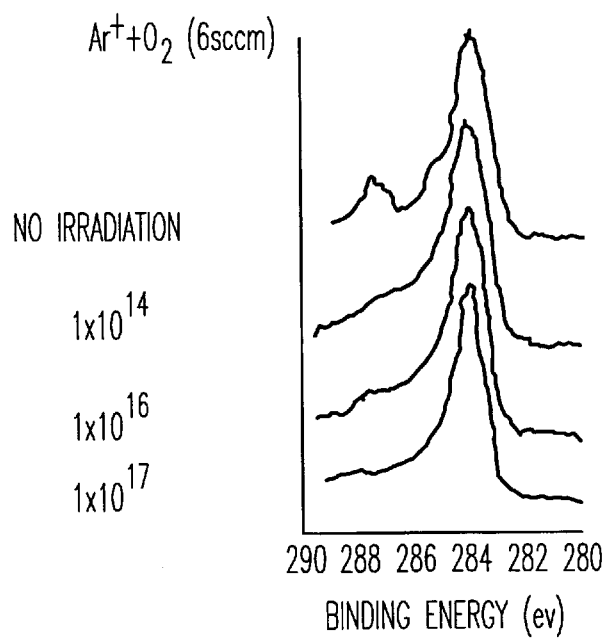
Figures 1, 15B:
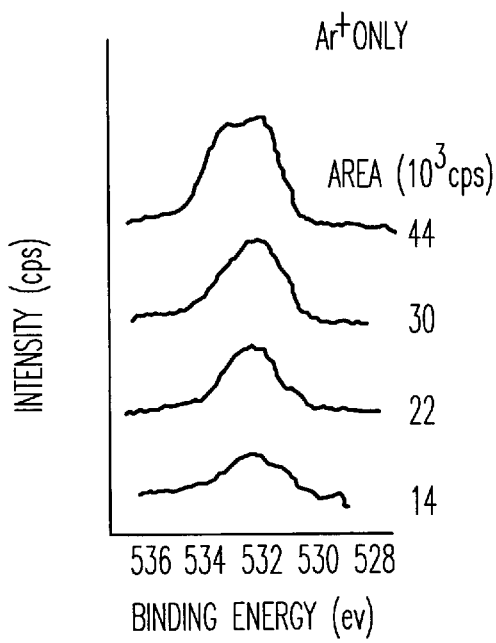
Figures 2, 15B:
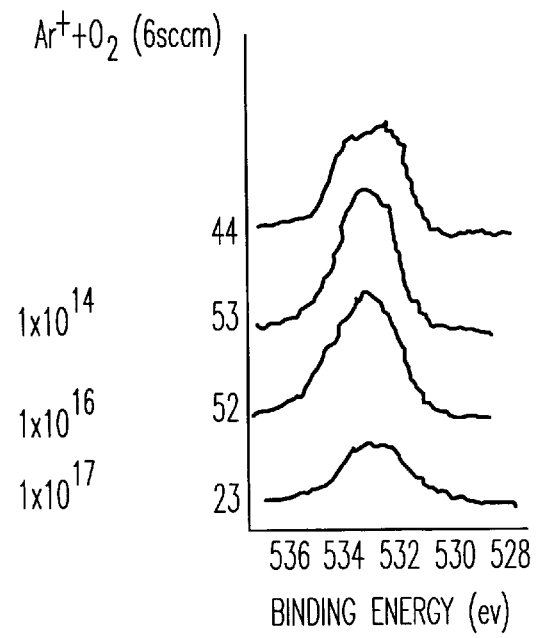

In the analytic ESCA results of PET of FIG. 15B-1 and 15B-2, when irradiating only argon onto the surface, it was found that the amount of oxygen decreased as argon irradiation increased, while when irradiating argon while blowing oxygen, the amount of oxygen increased in the range of up to $10^{16}$ ions/cm$^2$. It is considered that this evidences the generation of hydrophilic functional groups on the polymer surface.

(4) Peel-off test with Scotch (R) tape

Figure 16:
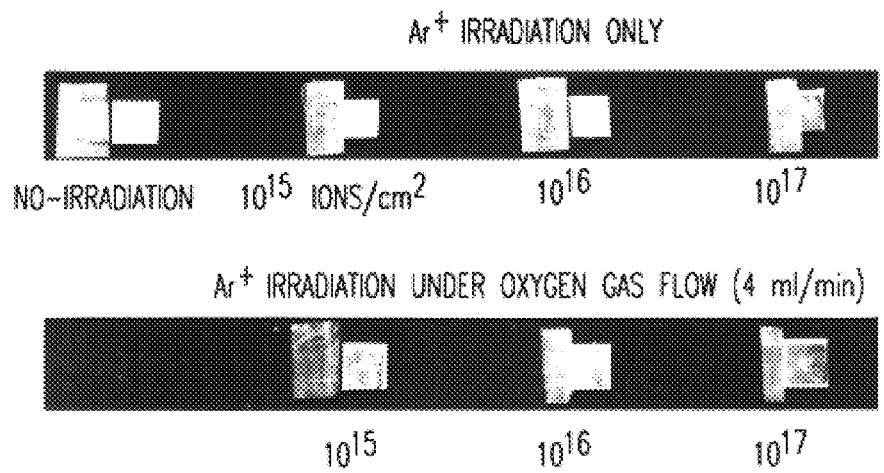
FIG. 16 is a photograph showing the results of the peel-off test with Scotch (R) tape of samples 3-1 and 3-2 on which aluminum was deposited, according to Example 3-4.
Figure 17:
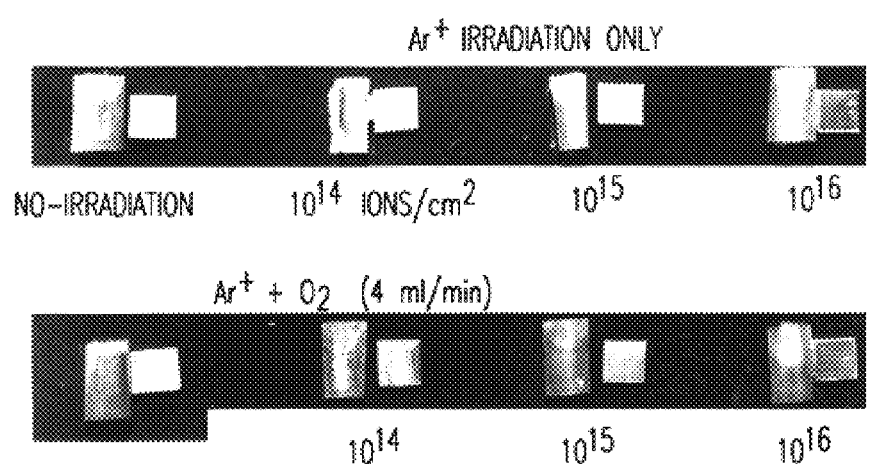
FIG. 17 is a photograph showing the results of the peel-off test with Scotch (R) tape of samples 3-1 and 3-2 on which copper was deposited.

Aluminum (2000 ⊥) and copper (2000 ⊥) were deposited on a sample without ion irradiating and samples 3-1 and 3-2 which were surface-modified with ion irradiation of $10^{15}$, $10^{16}$ and $10^{17}$ ions/cm$^2$ and then, a peel-off test with Scotch (R) tape was performed as in Example (1-5), and the results are illustrated in FIGS. 16 and 17.

In FIGS. 16 and 17, it shows that when only argon ions were irradiated, aluminum and copper were partially or totally peeled-off by Scotch (R) tape. However, when the metal was deposited after the surface was modified while blowing oxygen according to the present invention, such metals were not peeled-off.

(5) Test of adhesive strength by an adhesive

Figure 18:
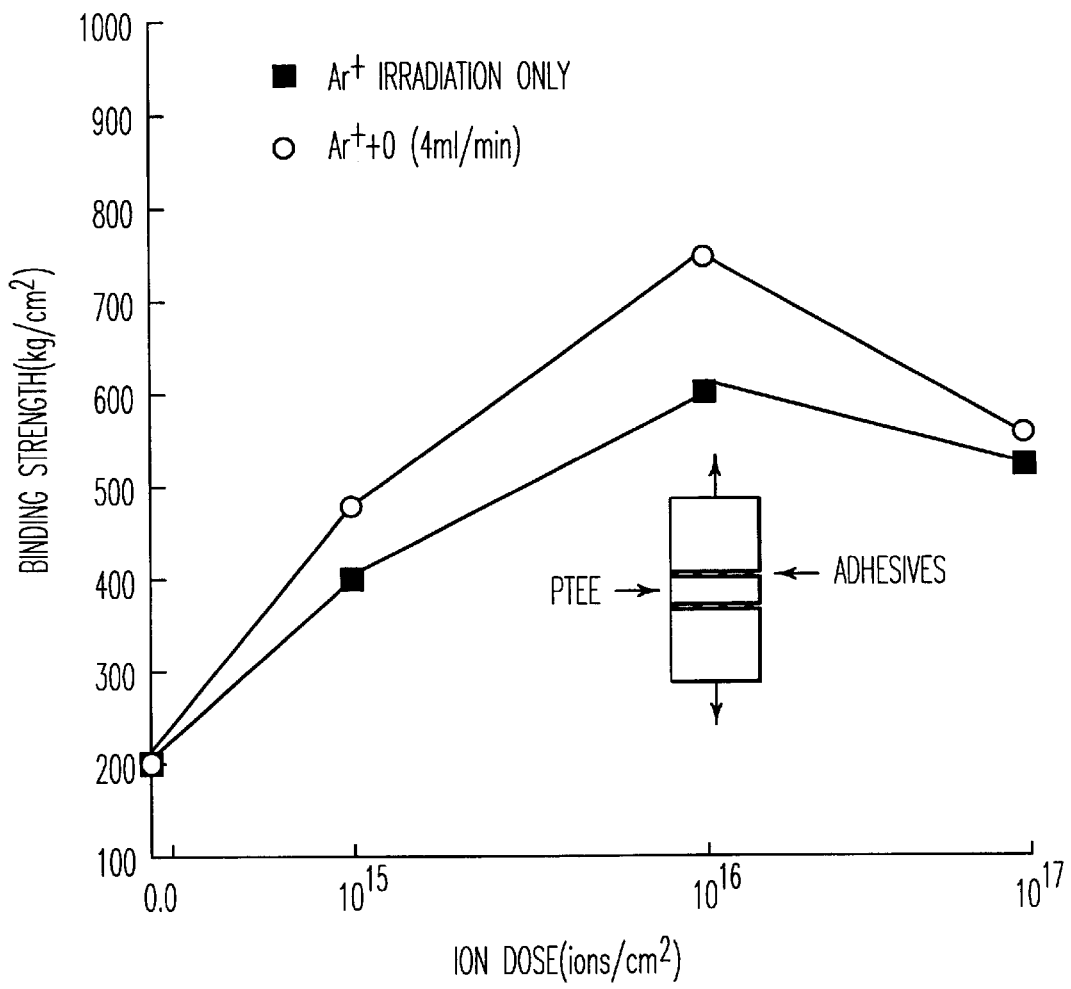
FIG. 18 is a graph showing the results of the adhesive strength test of samples 3-1 and 3-2 according to Example 3-5.

As illustrated in FIG. 18, an adhesive agent (Crystal Bond Buehler, Thermoplastic Cement No. 40-8100) was applied to both sides of surface-modified Teflon samples 3-1 and 3-2, and the adhesive strength thereof was tested. The result is shown in FIG. 18.

As shown in FIG. 18, adhesive strength increased by surface-modification with only argon irradiation of the present experiment, and adhesive strength further increased in the case of surface modification while blowing oxygen.

Example 4: Surface modification of ceramic materials

Figure 20:
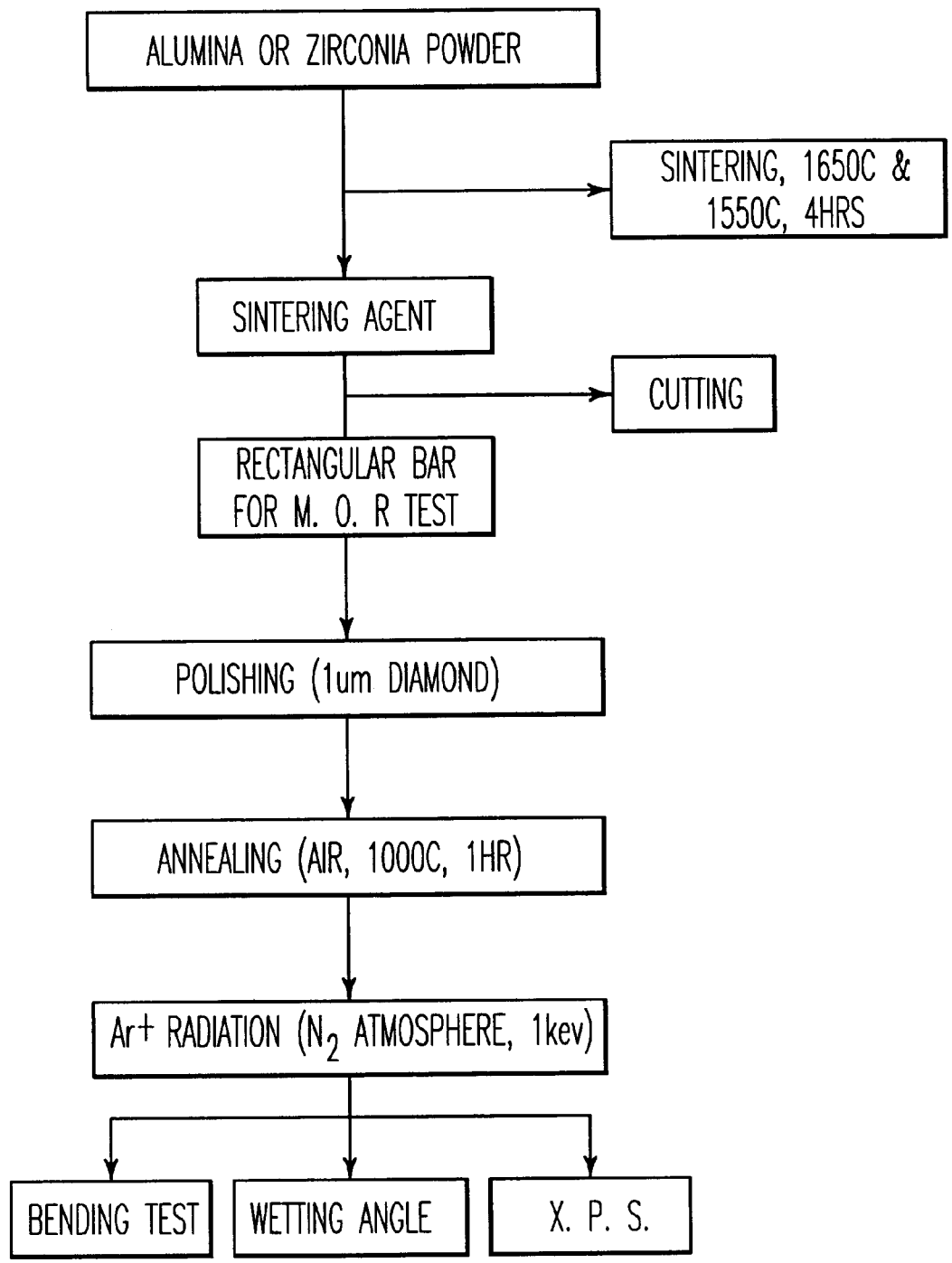
FIG. 20 is an experimental process flow chart showing the modification of a ceramic surface according to the present invention.

For the surface modification, as shown in FIG. 20, the sample was prepared. After cleaving a sintered alumina into a sample for strength measurement, the sample was polished to 1 μm so as to eliminate the effect of surface roughness on strength and was annealed in air for an hour at a temperature of 1000° C. so as to eliminate the stress remaining resulting from the cleavage and polishing.

A discharge voltage in the discharge tube of the ion source was controlled by using the apparatus of FIG. 1 to change the total amount of the ion beams irradiated on the sample surface to be $1 \times 10^{14}$–$2 \times 10^{17}/cm^2$. Nitrogen was used as a reactive gas and flow controlled to be 0–6 sccm(ml/min) using a ball type flowmeter.

Whether nitrogen was included in the bond of the compound consisting of the surface layer or not was identified through the X-ray electron spectrum. As a result, a peak was not observed on the non-modified sample, but was observed in the entire flow and irradiation range under the nitrogen air current.

Figure 21:
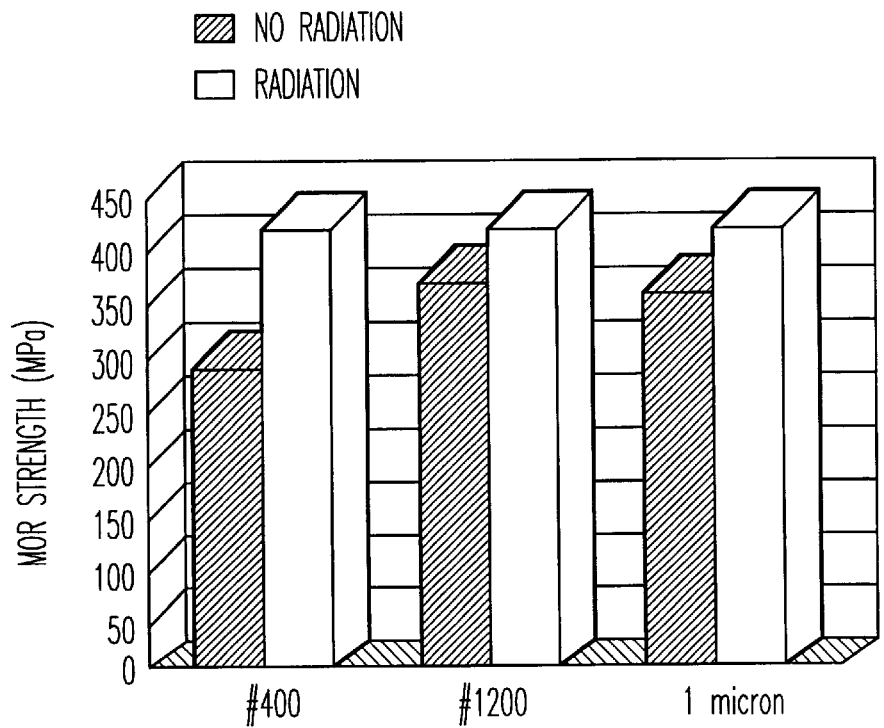
FIG. 21 is a graph showing the strength increase in accordance with surface polishing when a ceramic surface was modified according to the present invention.
Figure 22:
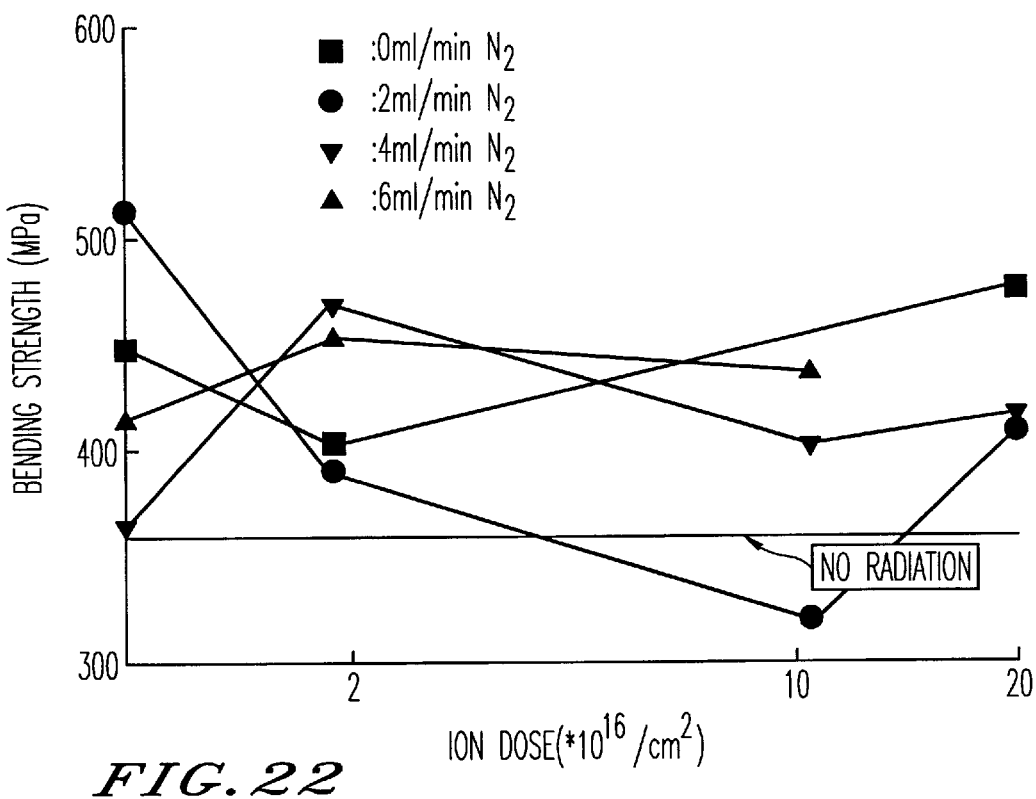
FIG. 22 is a graph showing bending strength when a ceramic surface was treated while varying the nitrogen flow a-mount and the amount of Argon ion beam under the conditions of the present invention.

FIG. 21 shows the strength of each alumina sample before and after the surface treatment according to each polishing grade. When a diamond wheel of No. 400 in FIG. 21 was used, the M.O.R strength of the non-modified sample was 293.9 MPa, but when the surface was modified under a nitrogen air current of 2 ml/min using Ar ions of 1 KeV, the strength was increased to be 422 MPa.

FIG. 21 shows the change of M.O.R strength according to the change in irradiation amount and nitrogen air current, wherein the strength of the non-modified sample was 361 MPa, but when the surface treatment was performed under the condition of nitrogen air current of 2 ml/min and an irradiation amount of $1 \times 10^{16}/cm^2$, the strength was increased by 1.43 times to be the maximum of 518 MPa.

Example 5. Surface modification of ITO and glass

Oxygen was used as a reactive gas instead of nitrogen, and the experiment was performed by a similar method to that for Example 4.

Argon energy irradiated through the ion beam was fixed to be 1 keV and the amount of ions was changed to be $1 \times 10^{15}$–$1 \times 10^{17}/cm^2$. The amount of oxygen was controlled in the range of 0–6 sccm(ml/min). In case only argon ion beams were used in this experiment, a little increase of adhesive force was expected by the cleaning effect on the surface. Therefore, the method of increasing the adhesive force by the chemical reaction with the reactive gas was compared with the above-described method.

Figure 23:
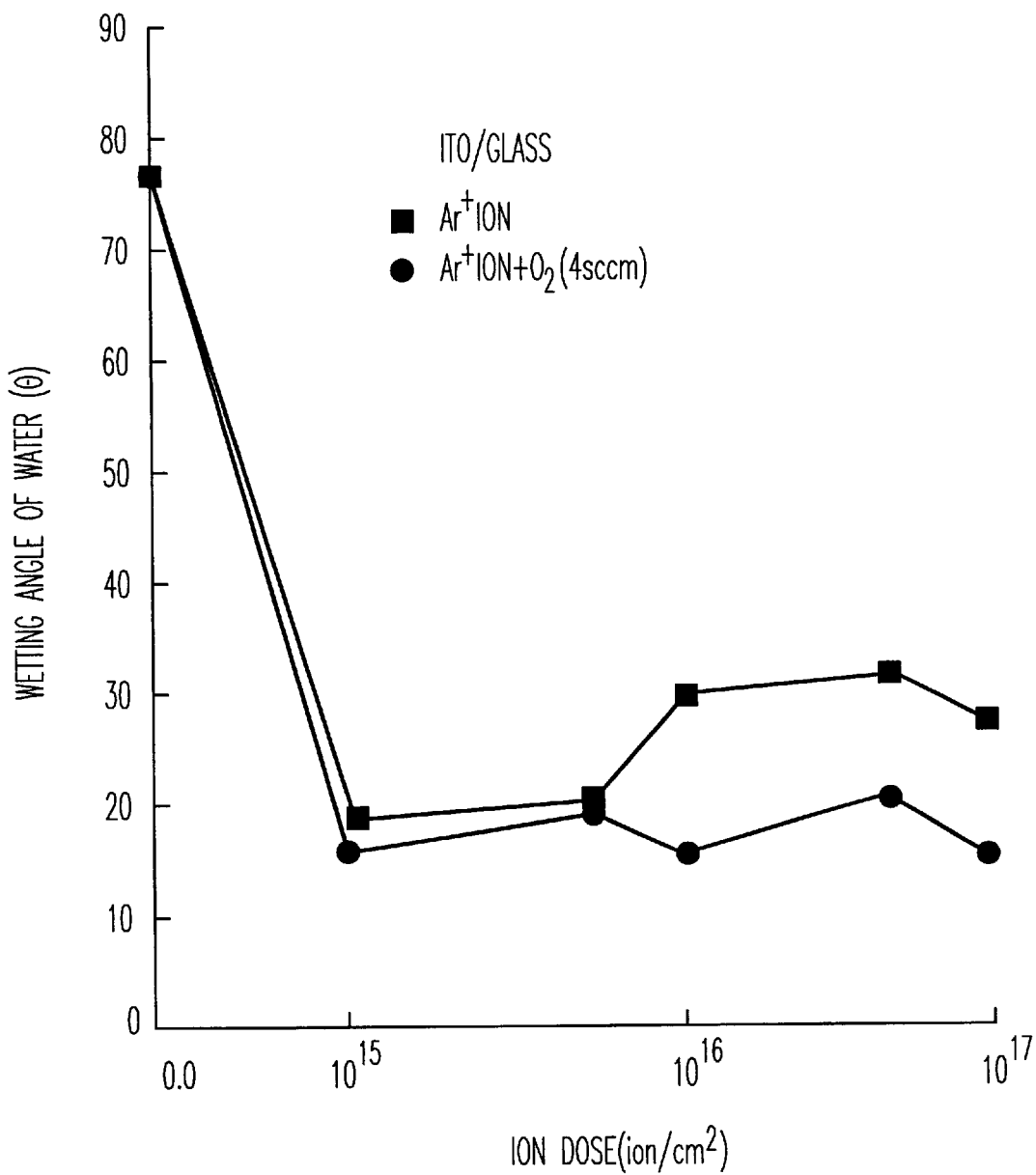
FIG. 23 is a graph showing the change in the wetting angle of an ITO surface when the amount of argon ions was varied and oxygen was provided at 4 ml/min.

FIG. 23 shows the change in a contact angle accordingly as the various amounts of ion beams were irradiated and oxygen was introduced at 4 sccm. In case the surface was not treated, the contact angle was about 77°, but when argon ions were irradiated at $1 \times 10^{15}/cm^2$, the angle was decreased to be 20° and when the amount of the ion beams exceeded the above amount, the angle was measured to be 30°. In case oxygen was provided at 4 sccm for the surface modification, the changing ratio of the contact angle was low in comparison with the case of the argon treatment, which shows that the introduction of oxygen gas is more effective in reducing the contact angle. Here, the contact angle was measured by a goniometer type ERMA angle meter, and the average value was obtained by four measurements of the advancing contact angle. The amount of distilled water used here was 0.025 ml.

Figure 24:
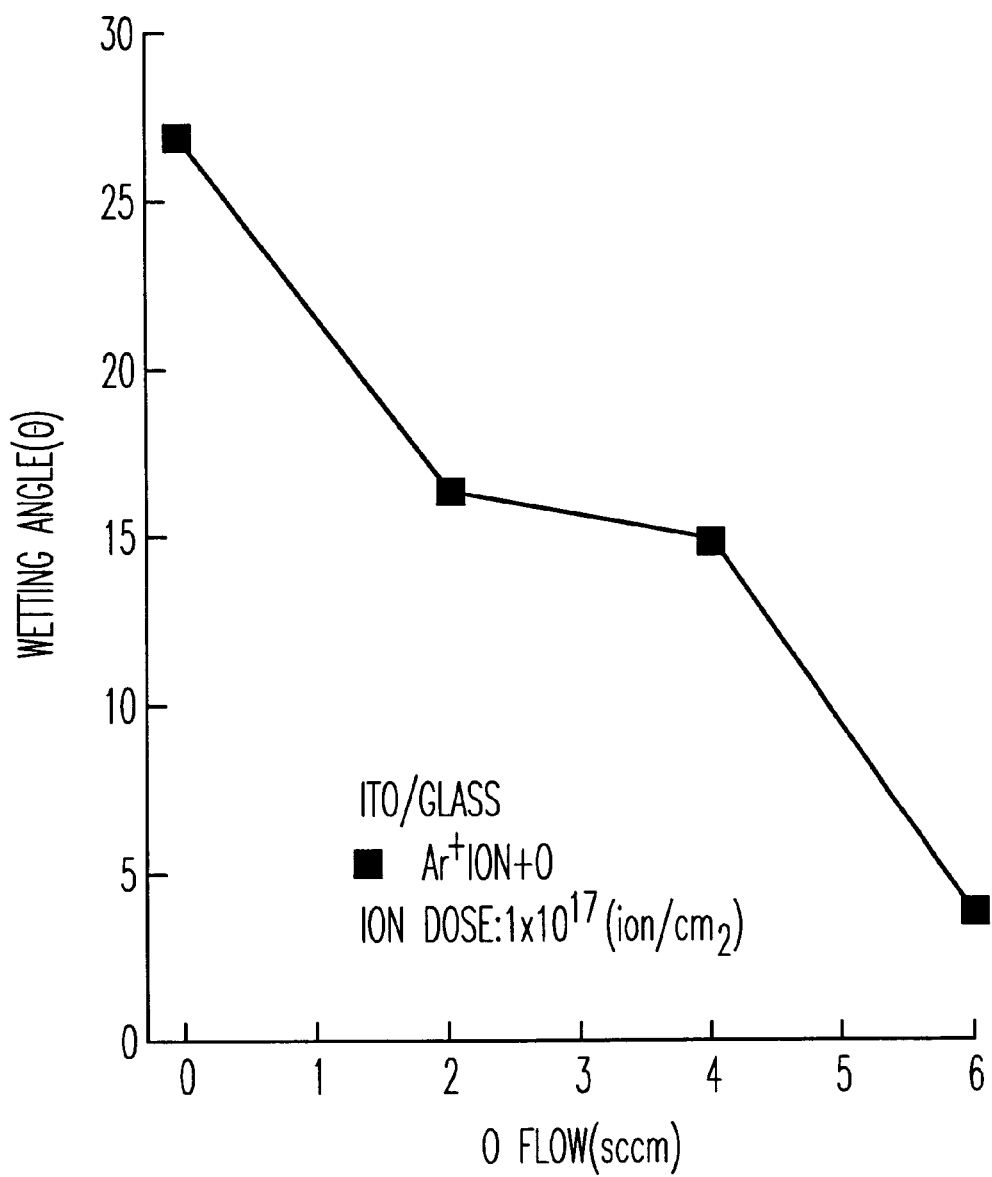
FIG. 24 is a graph showing the change in the wetting angle of an ITO surface when the amount of argon ions was fixed to be $1 \times 10^{17}$ ions/cm$^2$ and the amount of oxygen flow was varied at 0–6 ml/min.
Figure 25:
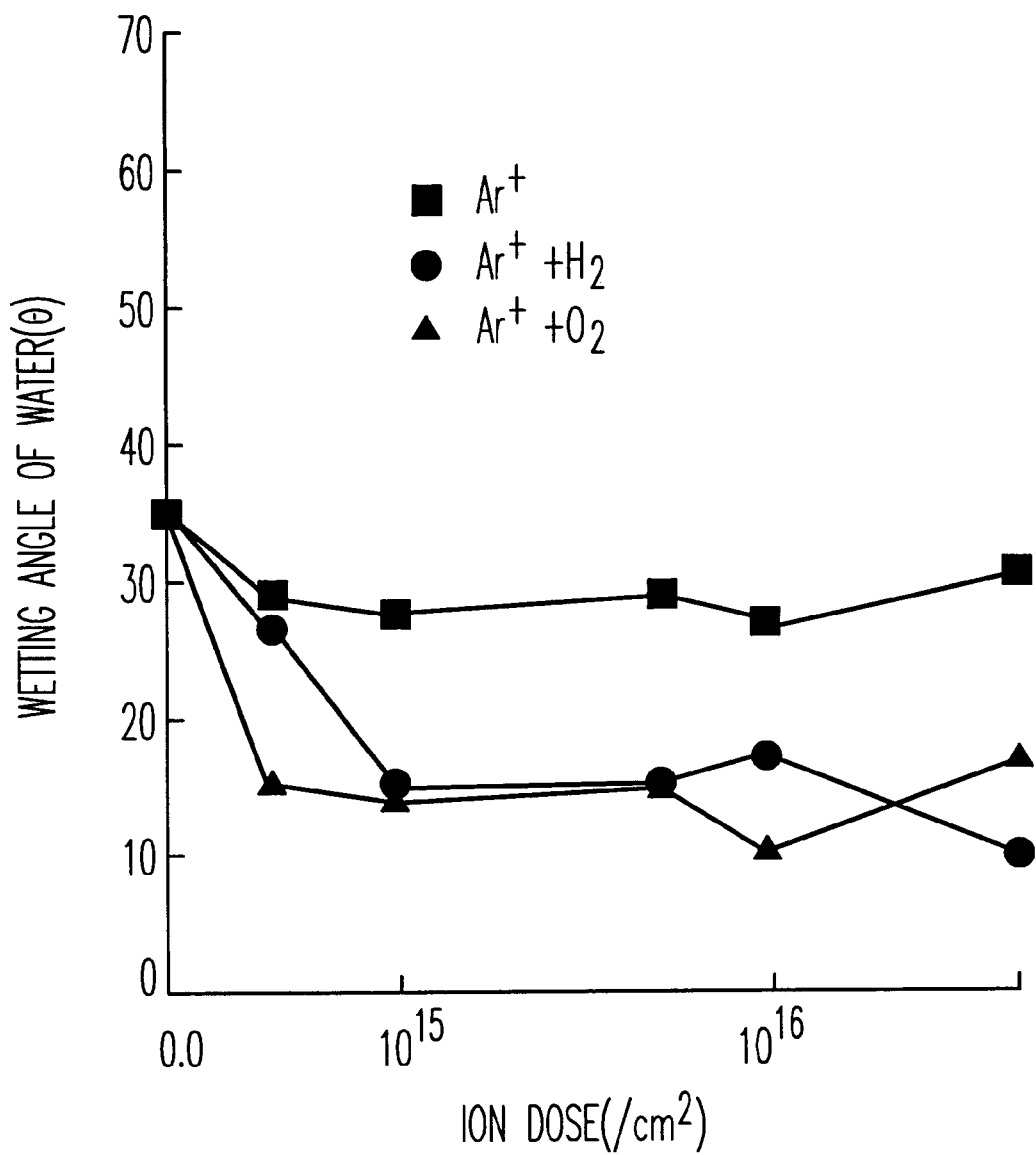
FIG. 25 is a graph showing the change in the wetting angle of a glass (BK7) surface when the amount of argon ions was varied at $5 \times 10^{14}$–$5 \times 10^{16}$/cm$^2$ and oxygen was provided at 4 ml/min under the conditions of the present invention.

FIG. 24 shows that the amount of introduced oxygen was changed to be 6 sccm with the amount of argon ions fixed to be $1 \times 10^{17}/cm^2$. As the amount of the oxygen introduction was increased, the contact angle was decreased and when the amount of the oxygen introduction was 6 sccm, the angle was decreased to be about 40°.

As a result of the experiment using glass (BK 7 glass),

What is claimed is:

1. A process for chemically reacting the surface of ceramic material, comprising irradiating a ceramic surface with $10^{14}$ to $5 \times 10^{17}$ ions/cm$^2$ of energized ion particles while contacting the ceramic surface with 1–8 ml/min of a reactive gas under a vacuum condition, wherein the reactive gas chemically reacts with the surface of the ceramic.

2. The process of claim 1, wherein the reactive gas is selected from the group consisting of oxygen, nitrogen, hydrogen, ammonia, carbon monoxide and mixtures thereof.

3. The process of claim 1, wherein the energized ion particles are selected from the group consisting of ion particles of argon, oxygen, air, krypton and any mixtures thereof.

4. The process of claim 1, wherein the energy of the energized ion particles is 0.5 keV–2.5 keV.

5. A process for modifying the surface of Indium Tin Oxide (ITO) or glass, comprising irradiating $10^{14}$ to $5 \times 10^{17}$ ions/cm$^2$ of energized ion particles onto the ITO or glass surface while blowing a 1–8 ml/min of reactive gas directly onto the ITO or glass surface under a vacuum condition.

6. The process of claim 5, wherein the reactive gas is selected from the group consisting of oxygen, nitrogen, hydrogen, ammonia, carbon monoxide and mixtures thereof.

7. The process of claim 5, wherein the energized ion particles are selected from the group consisting of ion particles of argon, oxygen, air, krypton and any mixtures thereof.

8. The process of claim 5, wherein the energy of the energized ion particles is 0.5 keV–2.5 keV.

9. The process as claim 5, comprising irradiating energized ion particles onto a ITO surface while blowing a reactive gas directly onto the ITO surface under a vacuum condition.

10. A process as claimed in claim 5, comprising irradiating energized ion particles onto the glass surface while blowing a reactive gas directly onto the glass surface under a vacuum condition.

* * * * *